US008369010B2

(12) United States Patent
Karasawa et al.

(10) Patent No.: US 8,369,010 B2
(45) Date of Patent: Feb. 5, 2013

(54) MICROSCOPE WITH MOTION SENSOR FOR CONTROL OF POWER SUPPLY AND LIGHT SOURCE

(75) Inventors: Masayoshi Karasawa, Hachioji (JP); Keisuke Tamura, Tachikawa (JP); Hideaki Endo, Hino (JP); Tetsuya Shirota, Hachioji (JP); Tsuyoshi Mochizuki, Hinoshi (JP)

(73) Assignee: Olympus Corporation, Tokyo (JP)

( * ) Notice: Subject to any disclaimer, the term of this patent is extended or adjusted under 35 U.S.C. 154(b) by 19 days.

(21) Appl. No.: 12/946,067

(22) Filed: Nov. 15, 2010

(65) Prior Publication Data
US 2011/0058253 A1 Mar. 10, 2011

Related U.S. Application Data

(63) Continuation of application No. PCT/JP2009/065363, filed on Sep. 2, 2009.

(30) Foreign Application Priority Data

Sep. 3, 2008 (JP) ................................. 2008-226044

(51) Int. Cl.
G05F 1/00 (2006.01)
G02B 21/00 (2006.01)
(52) U.S. Cl. ........................................ 359/368; 315/307
(58) Field of Classification Search .................. 359/368, 359/385, 388; 315/307, 309; 713/323
See application file for complete search history.

(56) References Cited

U.S. PATENT DOCUMENTS 4,415,952 A 11/1983 Hattori et al.
4,447,726 A * 5/1984 Mudge et al. ................. 250/342
5,861,985 A 1/1999 Ikoh
6,738,558 B2 * 5/2004 Ruehl et al. ................... 359/381
6,917,377 B2 * 7/2005 Aizaki et al. ..................... 348/79
6,924,607 B2 * 8/2005 Cash et al. ...................... 315/307
7,152,172 B2 * 12/2006 Tsirkel et al. .................. 713/323
2001/0024321 A1 9/2001 Ruehl et al.
(Continued)

FOREIGN PATENT DOCUMENTS

JP 57-14817 A 1/1982
JP 7-318807 A 12/1995
(Continued)

OTHER PUBLICATIONS

International Search Report and Written Opinion dated Oct. 13, 2009 (in English) in counterpart International Application No. PCT/JP2009/065363.

(Continued)

Primary Examiner — Mark Consilvio
(74) Attorney, Agent, or Firm — Holtz, Holtz, Goodman & Chick, PC

(57) ABSTRACT

A microscope includes a microscope main unit including a stage on which a specimen is to be placed; and a light source provided on the microscope main unit and emitting illumination light for illuminating the specimen. The microscope also includes a main power supply operable to be turned on and off; a sensor that senses the presence or absence of a subject in a front or side area of the microscope main unit; a determining unit that determines based on a result of the sensing whether the subject moves; and a control unit that turns on the light source when the main power supply is turned on, maintains the light source in an ON state when the determining unit determines that the subject moves, and turns off the light source when the determining unit determines that the subject does not move and a predetermined period of time passes.

8 Claims, 17 Drawing Sheets

U.S. PATENT DOCUMENTS

| | | | |
|---|---|---|---|
| 2002/0181095 A1* | 12/2002 | Ruehl et al. | 359/385 |
| 2005/0248839 A1* | 11/2005 | Yamaguchi | 359/385 |
| 2007/0126866 A1* | 6/2007 | Uchida | 348/79 |
| 2009/0322870 A1* | 12/2009 | Fujiki | 348/79 |

FOREIGN PATENT DOCUMENTS

| | | | |
|---|---|---|---|
| JP | 10073771 A * | 3/1998 | |
| JP | 11-9612 A | 1/1999 | |
| JP | 11-271635 A | 10/1999 | |
| JP | 2001-502441 A | 2/2001 | |
| JP | 2001091836 A * | 4/2001 | |
| JP | 2003167200 A * | 6/2003 | |
| JP | 2006-195274 A | 7/2006 | |
| JP | 2007-199443 A | 8/2007 | |
| WO | WO 98/18036 A | 4/1998 | |

OTHER PUBLICATIONS

Extended European Search Report (EESR) dated Sep. 16, 2011 (in English) in counterpart European Application No. 09811525.6.

* cited by examiner

MICROSCOPE WITH MOTION SENSOR FOR CONTROL OF POWER SUPPLY AND LIGHT SOURCE

CROSS-REFERENCE TO RELATED APPLICATIONS

This application is a continuation of PCT international application Ser. No. PCT/JP2009/065363 filed Sep. 2, 2009 which designates the United States, incorporated herein by reference, and which claims the benefit of priority from Japanese Patent Application No. 2008-226044, filed Sep. 3, 2008, all incorporated herein by reference.

BACKGROUND OF THE INVENTION

1. Field of the Invention

The present invention relates to a microscope and a method for controlling the microscope, and more particularly, to a microscope having a light source that emits illumination light for illuminating a specimen, and a microscope control method for controlling a light source that emits illumination light for illuminating a specimen.

2. Description of the Related Art

There has been a microscope that has a sensor of a light-reflecting type attached to a mirror tube, and turning on and off a light source that emits illumination light. When the sensor senses an observer, the microscope turns on the light source, and when the observer moves away from the sensor and cannot be sensed by the sensor, the microscope turns off the light source. In this microscope, since the light source is off while there is not an observer observing a specimen, specimens are not damaged by illumination light, and electric power is not wasted (see Japanese Laid-open Patent Publication No. 07-318807, for example).

There also has been a microscope that includes electric devices such as an electric stage, an electric revolver, and a light source, an electric control device for controlling the electric devices, and an operation switch for controlling the electric devices. The electric control device includes an operation checking timer. If the electric devices are not operated over a predetermined period of time, the light source is turned off. In this microscope, since the light source is turned off, if the electric devices are not operated over the predetermined period of time, specimens are not damaged by illumination light, and electric power is not wasted (see Japanese Laid-open Patent Publication No. 2006-195274, for example).

SUMMARY OF THE INVENTION

A microscope according to an aspect of the present invention includes a microscope main unit that includes a stage on which a specimen is to be placed; a light source that is provided on the microscope main unit and emits illumination light for illuminating the specimen; a main power supply that is operable to be turned on and off; a sensor that senses the presence or absence of a subject in a front area or a side area of the microscope main unit; a determining unit that determines based on a result of the sensing by the sensor whether the subject moves; and a control unit that turns on the light source when the main power supply is turned on, maintains the light source in an ON state when the determining unit determines that the subject moves, and turns off the light source when the determining unit determines that the subject does not move and a predetermined period of time passes.

A microscope according to another aspect of the present invention includes a light source that emits illumination light for illuminating a specimen; a sensor that senses the present or absence of a subject in a nearby area; and a control unit that controls the light source to enter one of an ON state, a standby state, and an OFF state, the light source emitting an optimum amount of illumination light for observation in the ON state, the light source emitting an amount of illumination smaller than that in the ON state in the standby state, the light source not emitting illumination light in the OFF state. The control unit includes a time measuring unit that measures a period of time during which the light source is controlled to maintain the ON state. When the sensor senses the presence of the subject, the control unit controls the light source to enter the ON state. When the sensor senses the absence of the subject and the period is within a first period of time, the control unit controls the light source to enter the OFF state.

A microscope according to still another aspect of the present invention includes a light source that emits illumination light for illuminating a specimen; an observing unit that operates through an observing operation; a first sensor that senses the presence or absence of a subject in a nearby area; a second sensor that senses an operation of the observing unit; and a control unit that controls the light source to enter one of an ON state, a standby state, and an OFF state, the light source emitting an optimum amount of illumination light for observation in the ON state, the light source emitting an amount of illumination smaller than that in the ON state in the standby state, the light source not emitting illumination light in the OFF state. The control unit includes a time measuring unit that measures a period of time during which the light source is controlled to maintain the standby state. When the light source is controlled to maintain the OFF state and the first sensor keeps sensing the presence of the subject within a first period of time, the control unit controls the light source to enter the standby state while the first sensor keeps sensing the subject. When the light source is controlled to maintain the OFF state and the second sensor senses an operation of the observing unit within the first period of time, the control unit controls the light source to enter the ON state.

A microscope according to still another aspect of the present invention includes a light source that emits illumination light for illuminating a specimen; a third sensor that senses the presence or absence of a subject in a nearby area; a fourth sensor that senses the presence or absence of the subject in a larger area than that of the third sensor; and a control unit that controls the light source to enter one of an ON state, a standby state, and an OFF state, the light source emitting an optimum amount of illumination light for observation in the ON state, the light source emitting an amount of illumination smaller than that in the ON state in the standby state, the light source not emitting illumination light in the OFF state. When the third sensor and the fourth sensor sense the presence of the subject, the control unit controls the light source to enter the ON state. When only the fourth sensor senses the presence of the subject, the control unit controls the light source to enter the standby state. When the third sensor and the fourth sensor sense the absence of the subject, the control unit controls the light source to enter the OFF state.

A method according to still another aspect of the present invention is for controlling a microscope that includes a light source that emits illumination light for illuminating a specimen, a sensor that senses the presence or absence of a subject, and a control unit that controls the light source to enter one of an ON state, a standby state, and an OFF state, the light source emitting an optimum amount of illumination light for observation in the ON state, the light source emitting an amount of illumination smaller than that in the ON state in the standby state, the light source not emitting illumination light in the OFF state. The method includes causing the light source to transit to the OFF state from the standby state, when the sensor senses that the subject does not move; causing the light source to transit to the ON state from the standby state, when the sensor senses that the subject moves; and causing the light source to transit to the ON state when the sensor senses that the subject moves, and causing the light source to further transit to the OFF state when the sensor senses that the subject does not move within a predetermined period of time.

The above and other features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following is a detailed description of embodiments of microscopes and microscope control methods according to the present invention, with reference to the accompanying drawings. However, the present invention is not limited to those embodiments.

First Embodiment

Figure 1:
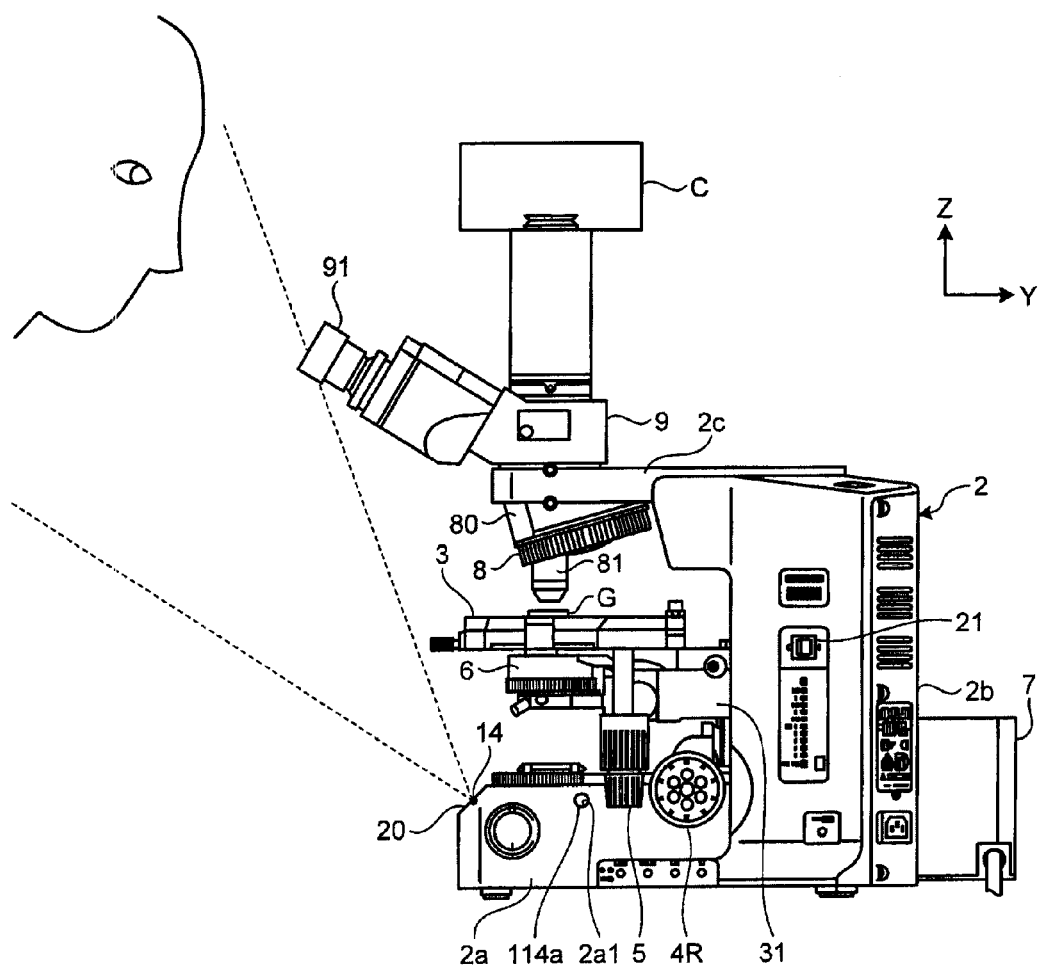
FIG. 1 is a side view of a microscope according to a first embodiment of the present invention.
Figure 2:
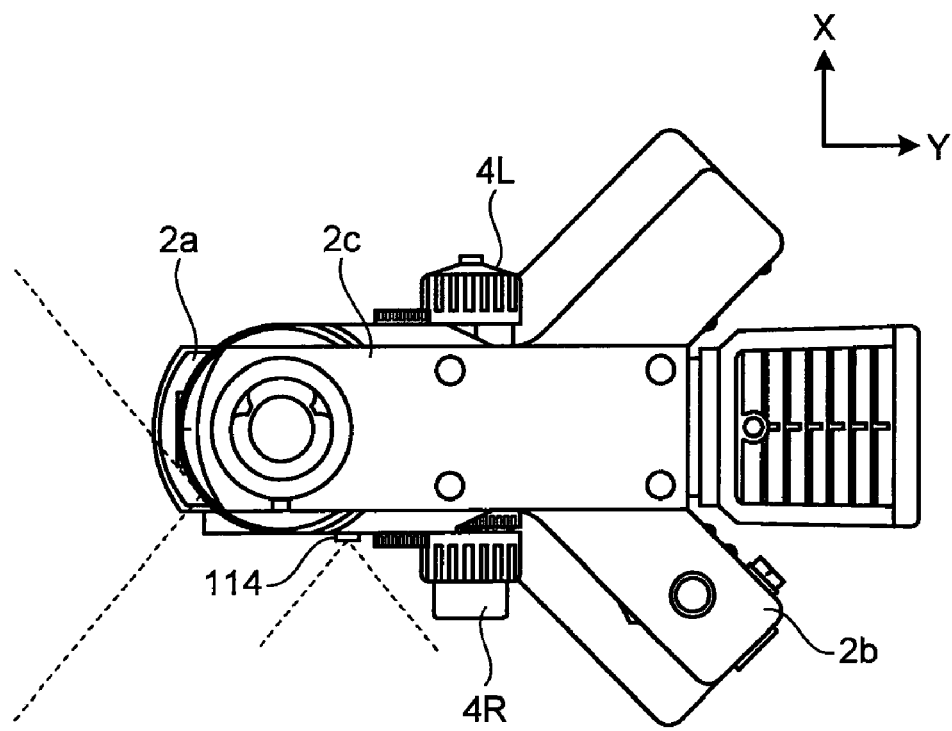
FIG. 2 is a plan view of the microscope according to the first embodiment of the present invention.

First, referring to FIGS. 1 and 2, a microscope according to a first embodiment of the present invention is described. FIG. 1 is a side view of the microscope according to the first embodiment of the present invention. FIG. 2 is a plan view of the microscope according to the first embodiment of the present invention.

As shown in FIGS. 1 and 2, the microscope according to the first embodiment of the present invention is a non-inverted microscope to observe a specimen from above, and includes a microscope main unit 2, a stage 3, focusing units 4R and 4L, an illumination optical system, and an observation optical system.

As shown in FIG. 1, the microscope main unit 2 includes a base unit 2a extending in the horizontal direction, a trunk unit 2b extending in a vertical direction from a rear portion of the base unit 2a, and an arm unit 2c extending forward in the horizontal direction from an upper portion of the trunk unit 2b. The microscope main unit 2 has a C shape, when viewed from the side.

A stage base 31 is attached to the front face of the trunk unit 2b in an elevating manner. The stage 3 is attached to the stage base 31, and the stage 3 moves up down with the stage base 31. The focusing unit 4R is rotatably attached to a portion that is located on the right side face of the microscope main unit 2 and in a rear portion of the base unit 2a. The focusing unit 4R moves the stage 3 up and down, and is connected to the stage base 31 with a rack-and-pinion mechanism (not shown) built in the microscope main unit 2. Accordingly, when the focusing unit 4R is rotated, the stage 3 moves up and down, with the upper face of the stage 3 being maintained in a horizontal position.

As shown in FIG. 2, the focusing unit 4L is rotatably attached to a portion that is located on the left side face of the microscope main unit 2 and in a rear portion of the base unit 2a. This focusing unit 4L is attached to the same shaft as the focusing unit 4R on the right side face. When the focusing unit 4L is rotated, the stage 3 moves up and down, and the focusing unit 4R on the right side face rotates. Likewise, when the focusing unit 4R on the right side face is rotated, the focusing unit 4L on the left side face rotates.

As shown in FIG. 1, the upper face of the stage 3 can move in the transverse direction (the X-direction) and in the longitudinal direction (the Y-direction), and a stage lever 5 is rotatably attached to a lower right portion of the stage 3. The stage lever 5 is designed to move the stage 3 in the transverse direction (the X-direction) and in the longitudinal direction (the Y-direction). When the stage lever 5 is rotated, the stage 3 moves to a desired position.

The upper face of the stage 3 is flat so that a glass slide G holding a specimen can be placed thereon. An opening (a transparent opening) (not shown) of such a size as not to drop the glass slide G is formed in the stage 3. With this arrangement, illumination light can pass through the stage 3.

A condenser 6 is attached to the lower face of the stage 3 in an elevating manner. By moving the condenser 6 in the transverse direction (the X-direction) and in the longitudinal direction (the Y-direction), centering can be performed.

A lamp house 7 is attached to a rear portion of the microscope main unit 2. A light source 71 (see FIG. 3) is built in the lamp house 7, and the light source 71 emits illumination light toward the front portion of the base unit 2a. The light source 71 may be a halogen lamp or an LED light source, for example. A mirror (not shown) is provided inside the front portion of the base unit 2a. The mirror is designed to change the traveling direction of the illumination light emitted from the light source 71 ninety degrees, and the light having the changed traveling direction is emitted onto the specimen placed on the stage 3 through the condenser 6 and the opening. Accordingly, the light source 71, the mirror, and the condenser 6 constitute the above mentioned illumination optical system.

A revolver main unit 80 is attached to the lower face of the top edge of the arm unit 2c, and a revolver 8 is rotatably attached to the revolver main unit 80. The revolver 8 is designed to switch objective lenses 81, and two or more objective lenses 81 can be mounted on the revolver 8. When the revolver 8 is revolved, one of the objective lenses 81 with different magnifications is selectively placed on the optical axis.

A mirror tube 9 is attached to the upper face of the top edge of the arm unit 2c, and an eyepiece 91 is attached to the mirror tube 9. The observation image transmitted from the specimen passes through the above mentioned objective lens 81 and the mirror tube 9, and forms an image. This image is observed through the eyepiece 91.

An optical path switching mechanism (not shown) is built in the mirror tube 9. The optical path switching mechanism is designed to switch optical paths, and can switch from an optical path leading to the eyepiece 91 to an optical path leading to a camera C. When the optical path is switched to the one leading to the camera C, an image captured by the camera C is enlarged and displayed on the screen of a personal computer connected to the camera C. Accordingly, the objective lenses 81, the mirror tube 9, the optical path switching mechanism, and the eyepiece 91 constitute the above mentioned observation optical system.

A main power supply 21 is provided on the right side face of the trunk unit 2b. The main power supply 21 is a seesaw-type switch designed to start and stop a power supply to the microscope. When the main power supply 21 is switched on, a power supply from a commercial power source to the microscope starts. When the main power supply 21 is switched off, the power supply from the commercial power source to the microscope stops.

Figure 3A:
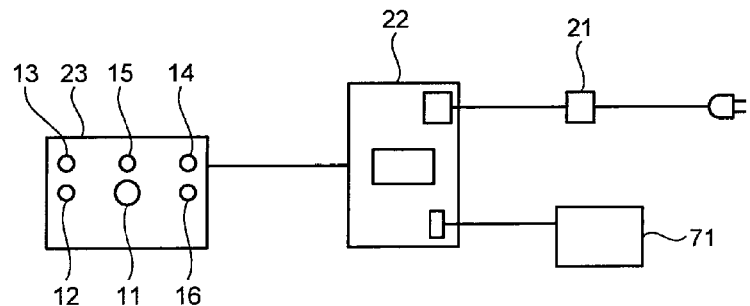
FIG. 3A is a conceptual view of the boards built in the microscope main unit illustrated in FIG. 1.

As shown in FIG. 3A, a control board 22 is connected to the main power supply 21, and a sensor board 23 and the light source 71 are connected to the control board 22.

Figure 4:
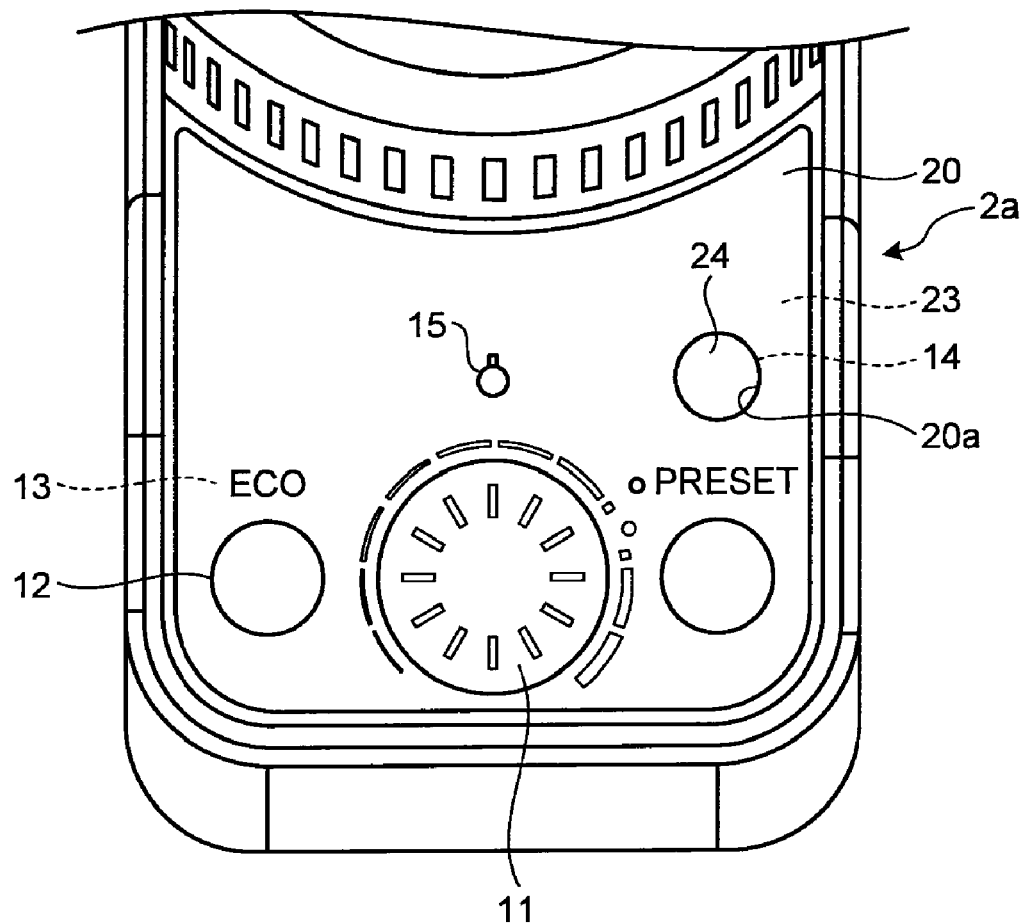
FIG. 4 is an external view of a base unit of the microscope illustrated in FIG. 1.

As shown in FIG. 4, the sensor board 23 is attached obliquely to the boundary portion between the front face and the upper face of the base unit 2a, and the front face of the sensor board is covered with an operating panel 20. The operating panel 20 is provided to cover the boundary portion between the front face and the upper face of the base unit 2a, and tilts at 45 degrees, becoming gradually higher from the front to the rear. Accordingly, the operating panel 20 faces the face of the observer looking into the eyepiece 91.

A light adjustment dial 11, an automatic lights-out switch 12, an automatic lights-out mode indicator 13, a motion sensor 14, and an illumination state indicator 15 are attached onto the sensor board 23.

As shown in FIG. 4, the light adjustment dial 11 is a revolving adjustment device, is attached to a middle portion of the sensor board 23, and is exposed through the middle portion of the operating panel 20.

The automatic lights-out switch 12 is attached onto the sensor board 23, so as to be located on the left side of the light adjustment dial 11. The automatic lights-out switch 12 is exposed through the operating panel 20. The automatic lights-out switch 12 is a switch for setting an automatic lights-out mode, and can be turned on and off.

The automatic lights-out mode indicator 13 is attached onto the sensor board 23, so as to be located above the automatic lights-out switch 12. The characters "ECO" is printed on the portion of the operating panel 20 serving as the front face of the automatic lights-out mode indicator 13. The automatic lights-out mode indicator 13 can light up. When the automatic lights-out mode indicator 13 lights up, the characters "ECO" stand out. When the automatic lights-out mode indicator 13 is turned off, the characters "ECO" become inconspicuous.

The motion sensor 14 is attached onto the sensor board 23, so as to be located obliquely on the upper right side of the light adjustment dial 11. A transparent opening 20a is formed in the portion of the operating panel 20 serving as the front face of the motion sensor 14. The motion sensor 14 senses a motion of a heat source having a temperature difference in a region located obliquely on the upper front side of the microscope. More specifically, the motion sensor 14 senses a motion of a heat source in the upper front region between 20 degrees and 90 degrees, and in the horizontal region of 100 degrees (50 degrees toward the left from the center, and 50 degrees toward the right from the center). An observer (particularly, the face or neck) can be a heat source having a heat fluctuation. Therefore, when an observer looking into the eyepiece 91 moves in some way, the heat source moves, and the motion sensor 14 senses the movement. In this manner, when an observer is observing a specimen, the motion sensor 14 senses the motion of the observer.

Figure 5A:
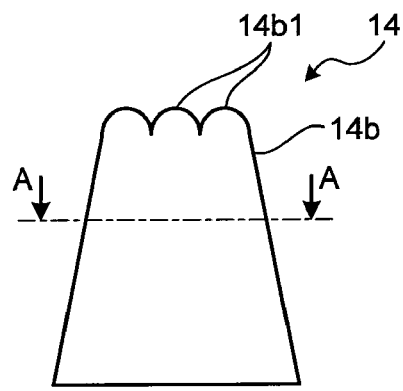
FIG. 5A is a front view of a motion sensor.
Figure 5B:
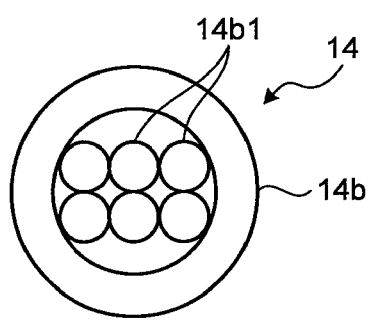
FIG. 5B is a plan view of the motion sensor illustrated in FIG. 5A.
Figure 5C:
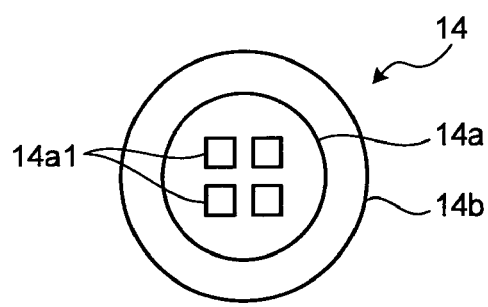
FIG. 5C is a cross-sectional view of the motion sensor, taken along the line A-A of FIG. 5A.

As shown in FIG. 5, the motion sensor 14 is a pyroelectric infrared sensor that senses changes in infrared rays. The motion sensor 14 is formed with a sensor module 14a and a lens member 14b. The sensor module 14a senses infrared rays emitted from a heat source having a temperature difference, and determines whether the sensed heat source has moved.

Figure 3B:
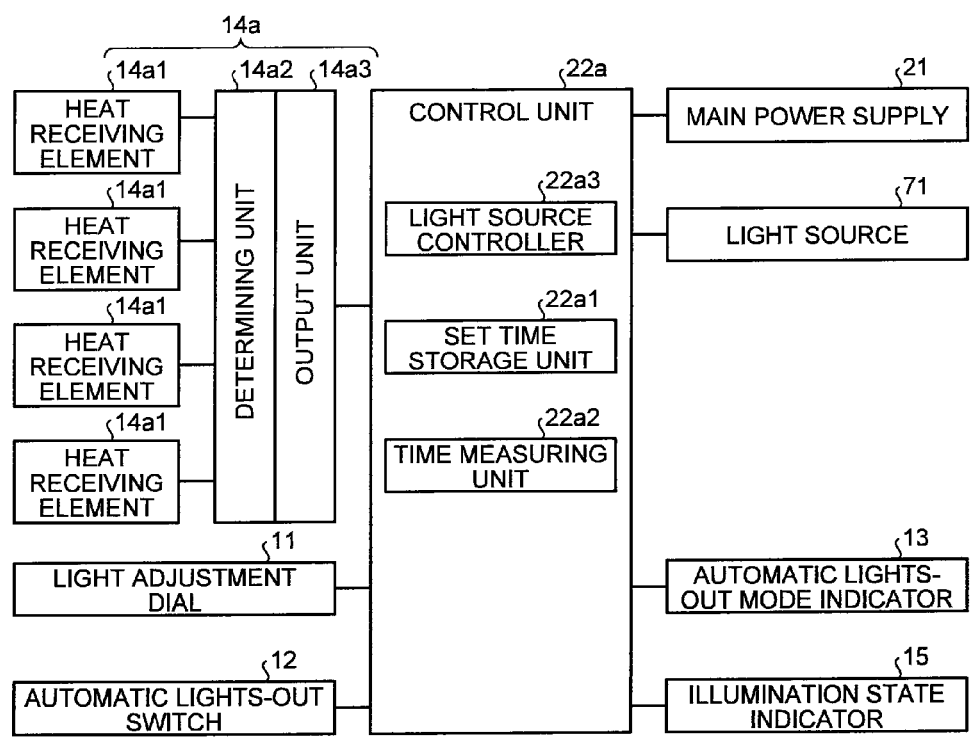
FIG. 3B is a block diagram showing an electrical structure of the microscope according to the first embodiment of the present invention.

As shown in FIG. 3B, the sensor module 14a includes four heat receiving elements 14a1, a determining unit 14a2, and an output unit 14a3. The heat receiving elements 14a1 sense changes in infrared rays, and the sensed changes in infrared rays are input to the determining unit 14a2. The determining unit 14a2 determines whether the heat source has moved, based on the infrared ray changes input from the four heat receiving elements. When the determining unit 14a2 determines that the heat source has moved, the output unit 14a3 outputs a signal (indicating that there is a motion).

As shown in FIG. 5A, single focus lenses (microlenses) 14b1 are formed in the lens member 14b, and each of the single focus lenses 14b1 has optical axes. Accordingly, in the sensing area of the motion sensor 14, sensing zones are formed. The number of sensing zones is equal to the product of the number of microlenses 14b1 and the number of the heat receiving elements 14a1. If there is a heat source in any of the sensing zones, infrared rays are emitted onto the heat receiving element 14a1.

The lens member 14b is exchangeably mounted on the sensor module 14a, and the sensing distance is determined by the lens member 14b. For example, a first lens member serving as a reference may be mounted, a second lens member having a shorter focal distance and a wider visual field than the first lens member may be mounted, or a third lens member having a longer focal distance and a narrower visual field than the first lens member may be mounted.

Figure 6A:
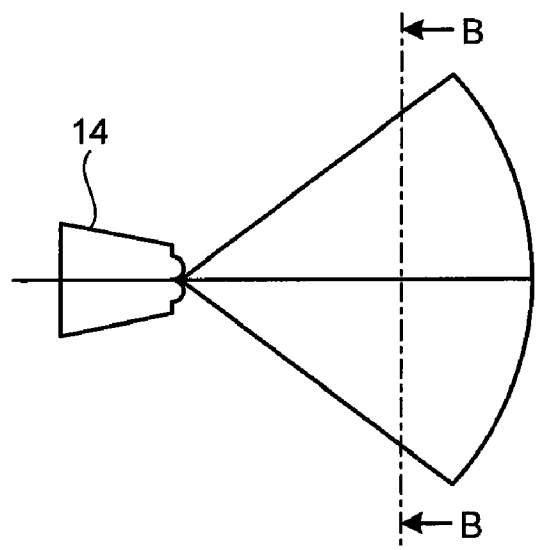
FIG. 6A is a side view showing a sensing area of a motion sensor.
Figure 6B:
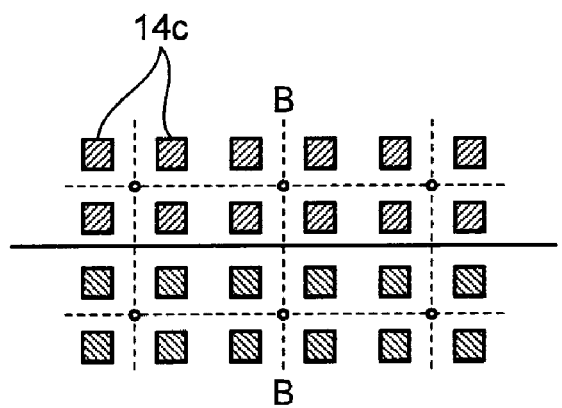
FIG. 6B is a sectional view of the sensing area, taken along the line B-B of FIG. 6A.

As shown in FIG. 5B, six microlenses 14b1 are formed in the lens member 14b, for example. Where there are four heat receiving elements 14a1 as described above, motions of a heat source is detected in 24 (6×4) sensing zones 14c, as shown in FIG. 6B. For the motion sensor 14 having the lens member 14b mounted thereon, one of the sensing zones in the sensing area at a location 300 mm away from the top edge of the motion sensor 14 is 40 mm by 40 mm in size.

Since the heat receiving elements 14a1 sense changes in infrared rays, the motion sensor 14 cannot output a signal only because a heat source emitting infrared rays exists in the sensing area.

As shown in FIG. 4, an attenuation member 24 is engaged with the transparent opening 20a. The attenuation member 24 is attached on the front side of the motion sensor 14 in the infrared incident direction. The attenuation member 24 is to attenuate incident infrared radiation, and is suitable for sensing a motion of an observer looking into the eyepiece 91.

The illumination state indicator 15 is attached onto the sensor board 23, so as to be located above the light adjustment dial 11. The illumination state indicator 15 is visually recognized through the operating panel 20. The illumination state indicator 15 may be in the following three states: "lighting up in green", "lighting up in red", and "being out". When "lighting up in green", the illumination state indicator 15 indicates that the light source 71 remains in an ON state. When "lighting up in red", the illumination state indicator 15 indicates that the light source 71 is off. When "being out", the illumination state indicator 15 indicates that the main power supply 21 is in an OFF state.

A control unit 22a is provided on the control board 22.

As shown in FIG. 3B, the control unit 22a is designed to control the light source 71. As well as the light source 71, the main power supply 21, the light adjustment dial 11, the automatic lights-out switch 12, the automatic lights-out mode indicator 13, the motion sensor 14, and the illumination state indicator 15 are connected to the control unit 22a.

When the automatic lights-out switch 12 is turned on, the control unit 22a turns on the automatic lights-out mode indicator 13. When the automatic lights-out switch 12 is turned off, the control unit 22a turns off the automatic lights-out mode indicator 13. When the automatic lights-out switch 12 is on, and the light source 71 is on, the control unit 22a causes the automatic lights-out mode indicator 13 to light up in green. When the light source 71 is turned off by a signal from the motion sensor 14 while the automatic lights-out switch 12 is on, the control unit 22a causes the automatic lights-out mode indicator 13 to light up in red.

Also, the control unit 22a includes a set time storage unit 22a1, a time measuring unit 22a2, a light source controller 22a3.

A predetermined period of time is stored in the set time storage unit 22a1. The predetermined time period is the period of time from when the observer leaves the microscope till when the light source 71 is turned off. In this embodiment, the stored set time is 1800 seconds (30 minutes).

The time measuring unit 22a2 is to measure the elapsed time. When the main power supply 21 is turned on, the time measuring unit 22a2 starts measuring time. When a signal (indicating there is a motion) is input from the motion sensor 14 within the period of time stored in the set time storage unit 22a1, the time measuring unit 22a2 restarts measuring the elapsed time from zero.

The light source controller 22a3 controls not only the switching on and off of the light source 71 but also the intensity of the illumination light. When the main power supply 21 is turned on, the light source controller 22a3 turns on the light source 71. When the main power supply 21 is turned off, the light source controller 22a3 turns off the light source 71. If the signal (indicating that there is a motion) is input from the motion sensor 14 within the set time period stored in the set time storage unit 22a1 while the automatic lights-out switch 12 is on, the light source controller 22a3 maintains the light source 71 in an ON state. If the signal (indicating that there is a motion) is not input from the motion sensor 14 within the set time period stored in the set time storage unit 22a1, the light source controller 22a3 turns off the light source 71.

Where the automatic lights-out switch 12 is off, the light source controller 22a3 does not turn off the light source 71 even if any signal is not input from the motion sensor 14 within the set time period stored in the set time storage unit 22a1.

The light source controller 22a3 also controls the light source 71 so that the intensity of the illumination light varies in accordance with the operation of the light adjustment dial 11. More specifically, when the light adjustment dial 11 is revolved, the light source controller 22a3 changes the voltage of the light source 71 in accordance with the amount of the revolution.

Figure 7:
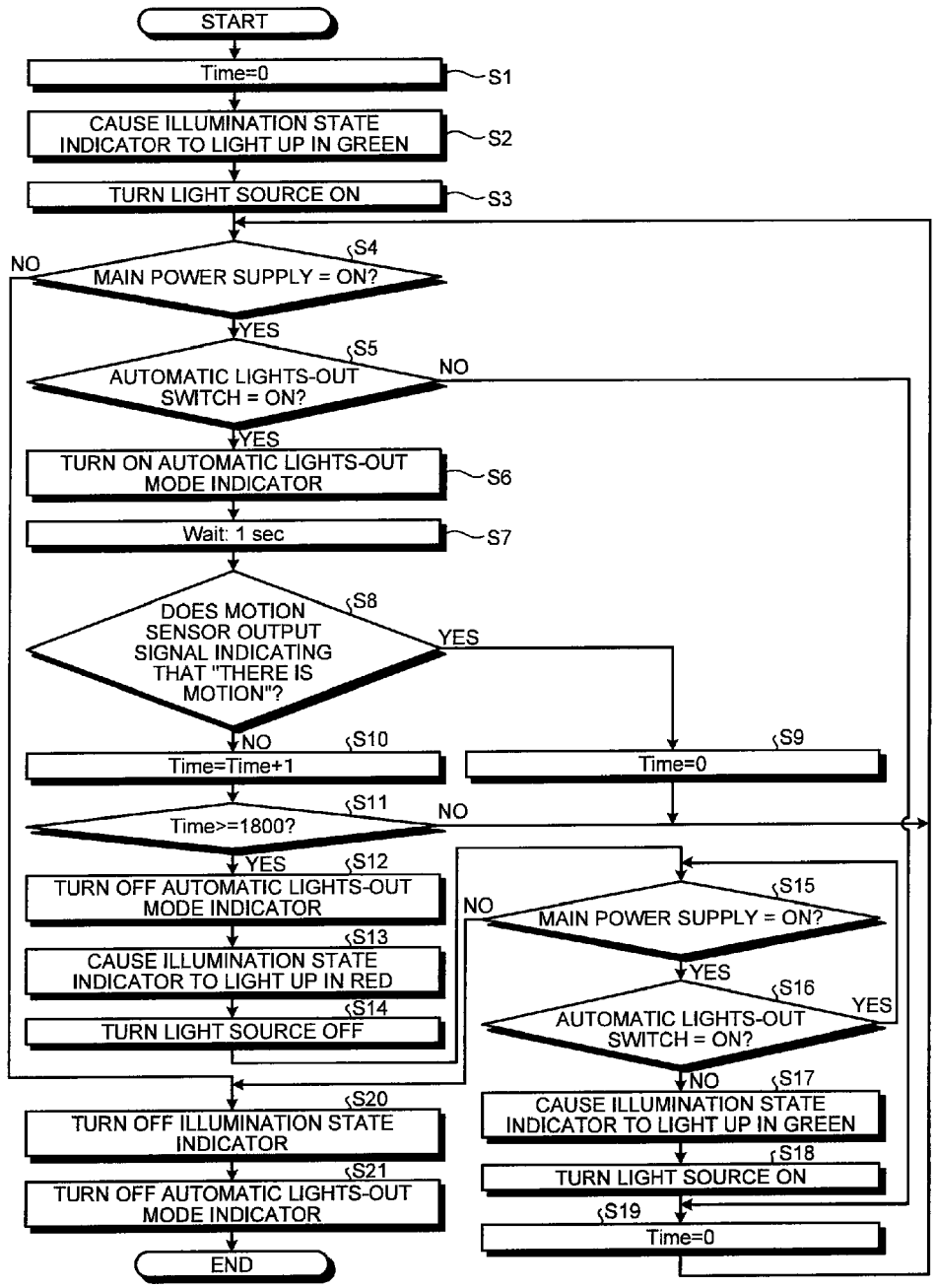
FIG. 7 is a flowchart showing control procedures for controlling a light source of a microscope.

As shown in FIG. 7, when the main power supply 21 is turned on, the microscope according to the first embodiment of the present invention starts measuring the elapsed time (step S1), and causes the illumination state indicator 15 to "light up in green" (step S2). The light source 71 is then turned on (step S3). If the main power supply is on (step S4), and the automatic lights-out switch is on (step S5) at this point, the automatic lights-out mode indicator 13 lights up (step S6).

After one second has passed (step S7), the motion sensor 14 determines whether a heat source has moved. If the motion sensor 14 senses the motion of the heat source (step S8: Yes), the measurement of the elapsed time is restarted from zero (step S9).

If the motion sensor 14 does not sense a motion of a heat source, the microscope determines that "there is not a motion" (step S8: No), and continues to measure the elapsed time (step S10). The procedures of steps S4 through S10 are repeated (step S11: No), until the set time period (30 minutes) has passed.

After the set time period stored in the set time storage unit 22a1 has passed, the automatic lights-out mode indicator 13 is temporarily turned off (step S12), and the illumination state indicator 15 is caused to "lights up in red" (step S13). The light source 71 is then turned off (step S14).

Thereafter, this state is maintained, unless the main power supply 21 is turned off (step S15: No), or the automatic lights-out switch 12 is turned off (step S16: No).

When the automatic lights-out switch 12 is turned off (step S16: No), the illumination state indicator 15 lights up in green (step S17), and the OFF state of the light source 71 is cancelled. The light source 71 is then turned on (step S18), and the measurement of the elapsed time is restarted from zero (step S19).

When the main power supply 21 is turned off (step S15: No), the illumination state indicator 15 is turned off (step S20), and the automatic lights-out mode indicator 13 is also turned off (step S21). The series of procedures then comes to an end.

The above described microscope according to the first embodiment turns on the light source 71 when the main power supply 21 is turned on, and maintains the light source 71 in an ON state when the motion sensor 14 senses a motion of a heat source within the set time period stored in the set time storage unit 22a1. When the motion sensor 14 does not sense a motion of a heat source within the set time period stored in the set time storage unit 22a1, the microscope turns off the light source 71. Accordingly, while an observer is looking into the eyepiece 91, the light source 71 is maintained in an ON state, so as not to cause any inconvenience to the observer.

When an observer is not looking into the eyepiece 91, the motion sensor 14 does not sense any motion of a heat source within the set time period stored in the set time storage unit 22a1, and the light source 71 is turned off accordingly. With this arrangement, the specimen is not damaged by the illumination light, and electricity is not wasted. Also, since a change in the infrared rays emitted from an observer is sensed, any other substance is inadvertently sensed.

In the above described microscope according to the first embodiment, the motion sensor 14 may be designed as a detachable unit, and may be placed at an arbitrary position.

Also, an output terminal may be connected to the control unit 22a. When the main power supply 21 is turned on, the output terminal starts outputting control signals. When the motion sensor 14 senses a motion of a heat source within the set time period stored in the set time storage unit 22a1, the output terminal continues to output control signals. When the motion sensor 14 does not sense a motion of a heat source within the set time period stored in the set time storage unit 22a1, the output terminal stops outputting control signals. For example, by connecting the camera C to this output terminal, the camera can be activated while output signals are being input, and the camera can be stopped when the input of output signals is stopped.

Second Embodiment

Referring now to FIGS. 1 and 2, a microscope according to a second embodiment is described. The microscope according to the second embodiment is the same as the microscope according to the first embodiment, except for the attachment position of the motion sensor 14. Therefore, only the attachment position of a motion sensor 114 is described, and explanation of the other aspects is omitted in the following.

The motion sensor 114 of the microscope according to the second embodiment is attached to the inner right side of the base unit 2a, so as to be located on the front side of the focusing unit 4R on the right. A transparent opening 2a1 is formed at the portion of the base unit serving as the front face of the motion sensor 114. The motion sensor 114 is to sense a motion of a heat source in a side region of the microscope. More specifically, the motion sensor 114 senses a motion of a heat source in the vertical side region of 70 degrees (35 degrees in the upward direction from the center, and 35 degrees in the downward direction from the center), and in the longitudinal side region of 100 degrees (50 degrees frontward from the center, and 50 degrees rearward from the center).

Since an observer (particularly the hand or arm) can be a heat source having a temperature difference, the motion sensor 114 senses the hand or arm of the observer when the observer handles the focusing unit 4R or the stage lever 5. Accordingly, when an observer is observing a specimen, the motion sensor 114 senses the motion of the observer.

The above described microscope according to the second embodiment turns on the light source 71 when the main power supply 21 is turned on, and maintains the light source 71 in an ON state when the motion sensor 114 senses a motion of a heat source within the set time period stored in the set time storage unit 22a1. When the motion sensor 114 does not sense a motion of a heat source within the set time period stored in the set time storage unit 22a1, the microscope turns off the light source 71. Accordingly, if an observer handles the focusing unit 4R or the stage lever 5 at least once within the set time period, the motion sensor 114 senses the motion of the heat source. Meanwhile, the light source 71 is maintained in an ON state, so as not to cause any inconvenience to the observer.

If an observer does not handle the focusing unit 4R or the stage lever 5 at all within the set time period, the motion sensor 114 does not sense any motion of a heat source, and the light source 71 is turned off accordingly. Since the light source 71 is turned off while the microscope is not used, the specimen is not damaged by the illumination light, and electricity is not wasted. Also, since a motion of an observer is sensed, any other substance is inadvertently sensed.

In the microscope according to the second embodiment, the focusing unit 4R needs to be handled, even where the optical path is switched from the eyepiece 91 to the camera C, and an observer can observe the specimen through the screen of a personal computer without looking into the eyepiece 91. Accordingly, when the microscope is used, the motion sensor 114 can sense a motion of a heat source.

The microscope according to the second embodiment may be a microscope that has the above described motion sensor 114 added to the microscope according to the first embodiment. When one of the motion sensors 14 and 114 determines that there is a motion within the set time period, the power supply to the light source 71 is continued. When both of the motion sensors 14 and 114 determine that there is not a motion within the set time period, the light source 71 is turned off.

Third Embodiment

Next, a microscope according to a third embodiment is described. The microscope according to the third embodiment is the same as the microscope according to the first embodiment, except that an additional attenuation member is overlapped on the attenuation member 24. Like the attenuation member 24, the additional attenuation member is attached on the front side of the motion sensor 14 in the infrared incident direction. The additional attenuation member is to attenuate incident infrared radiation, and is formed with a polyethylene sheet that transmits infrared rays, for example.

Since the additional attenuation member is added, the sensing distance of the motion sensor 14 is shortened in the microscope according to the third embodiment. Accordingly, false sensing due to a rapid temperature change caused by an air conditioner can be prevented.

Fourth Embodiment

Figure 8:
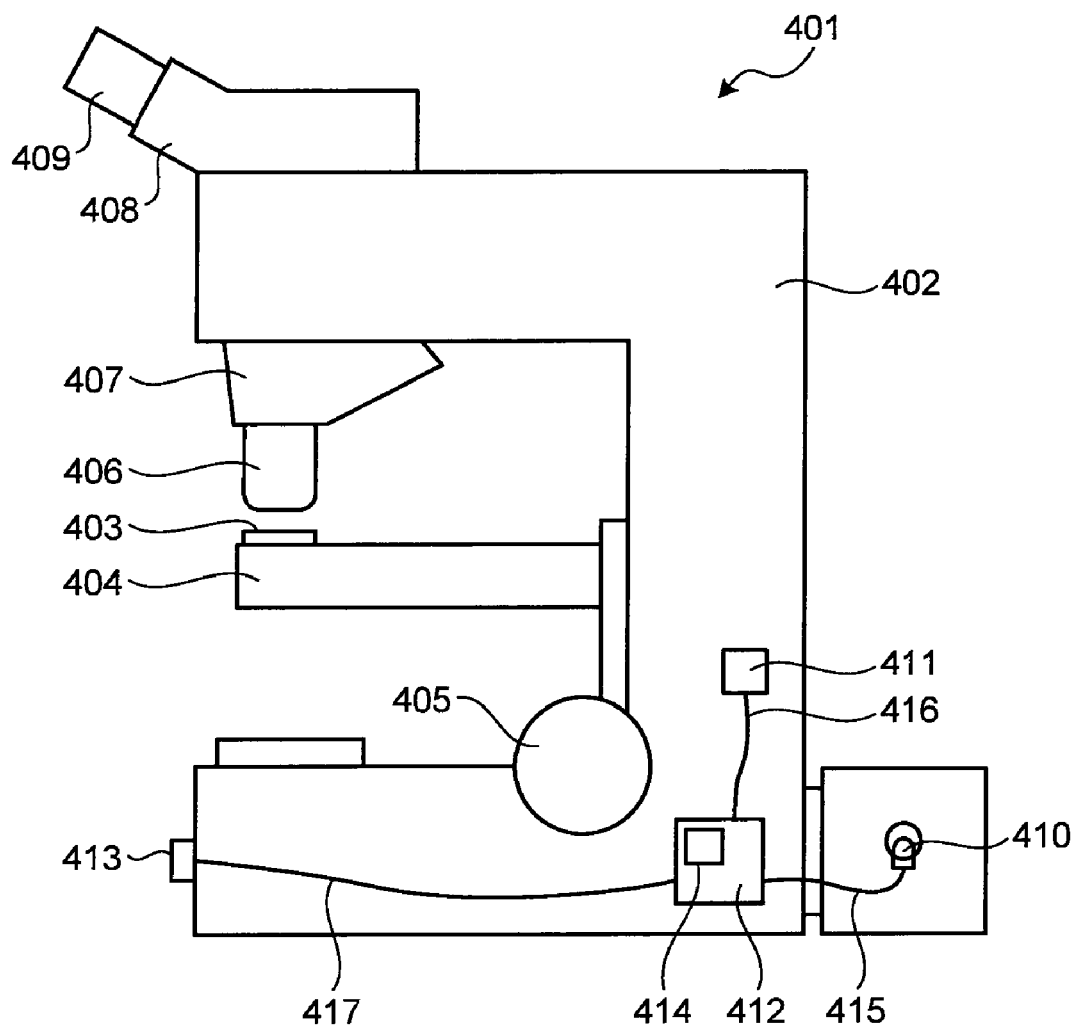
FIG. 8 illustrates an example structure of a microscope according to a fourth embodiment of the present invention.

Referring now to FIG. 8, the structure of a microscope according to a fourth embodiment of the present invention is described. FIG. 8 illustrates an example structure of the microscope according to the fourth embodiment of the present invention. A microscope 401 includes a microscope main unit 402, a stage 404 on which a specimen 403 is to be placed, a focusing unit 405 for focus adjustment, an observation optical system for enlarging and observing the specimen 403, and an illumination optical system for uniformly illuminating the specimen 403.

The stage 404 is designed to be capable of moving in a plane perpendicular to the optical axis. Further, the focusing unit 405 can cause the stage 404 to move in the optical axis direction. The observation optical system includes an objective lens 406 for obtaining an enlarged image of the specimen 403, a revolver 407 that exchangeably holds several types of objective lenses 406 on the optical axis, a mirror tube 408 that leads the enlarged image to an observed visual field, and an eyepiece 409 that further enlarges the enlarged image to form a virtual image.

The illumination optical system includes a light source 410, a condenser lens (not shown) that gathers illumination light emitted from the light source 410, a reflection mirror (not shown) that changes the direction of the illumination light, and a condenser lens (not shown) for directing the illumination light onto a specimen. The light source 410 may be a halogen lamp or an LED light source, for example.

A main power supply 411 of the microscope 401 is attached to the microscope main unit 402. By turning on the main power supply 411, a control unit 412 that performs various kinds of control in the microscope, and an observer sensor 413 (a sensor, a first sensor) that senses an observer are activated. The observer sensor 413 is formed with a sensor utilizing infrared rays or ultrasonic waves, for example, and performs a sensing operation in an adjacent region on the front side of the observer sensor 413.

One of the objects to be controlled by the control unit 412 is the electric power to be supplied to the light source 410. The control unit 412 causes a time measuring unit 414 to operate in cooperation with the observer sensor 413, to supply appropriate electric power to the light source 410 in appropriate timing. The time measuring unit 414 is provided inside the control unit 412. With this arrangement, an unnecessary power supply to the light source 410 is prevented while no observers are observing the specimen 403, and the power consumption of the microscope 401 can be reduced. Also, through the later described control operation, the light source 410 can be quickly recovered from the power saving state to a state in which appropriate electric power for observation is supplied.

The control unit 412 is connected to the light source 410, the main power supply 411, and the observer sensor 413 via a signal line 415, a signal line 416, and a signal line 417, respectively.

In the following, the control over the power supply to the light source 410 of the microscope 401 according to the fourth embodiment is described in detail. First, the roles of the observer sensor 413 and the time measuring unit 414 that realize an optimum power supply in cooperation with the control unit 412 are described.

The observer sensor 413 is placed on a front face of the microscope 401, as shown in the example structure of FIG. 8. For example, the observer sensor 413 emits infrared rays, and, based on the reflection of the infrared rays, determines whether there is an observer in an adjacent area in front of the observer sensor 413. More specifically, if there is an observer in an adjacent area in front of the observer sensor 413, the observer sensor 413 transmits an electric signal to the control unit 412 via the signal line 417, with the electric signal indicating that there is an observer. If there is not an observer in the adjacent area in front of the observer sensor 413, the observer sensor 413 transmits an electric signal to the control unit 412 via the signal line 417, with the electric signal indicating that there is not an observer.

Although an electric signal is transmitted from the observer sensor 413 to the control unit 412 whether or not there is an observer in the above example case, the present invention is not limited to that arrangement. For example, only when there is an observer (or only when there is not an observer), an electric signal may be transmitted to notify the control unit 412 of the presence (or absence) of an observer.

The time measuring unit 414 measures the elapsed time in synchronization with the control unit 412 switching the states of the electric supply to the light source 410.

Figure 9:
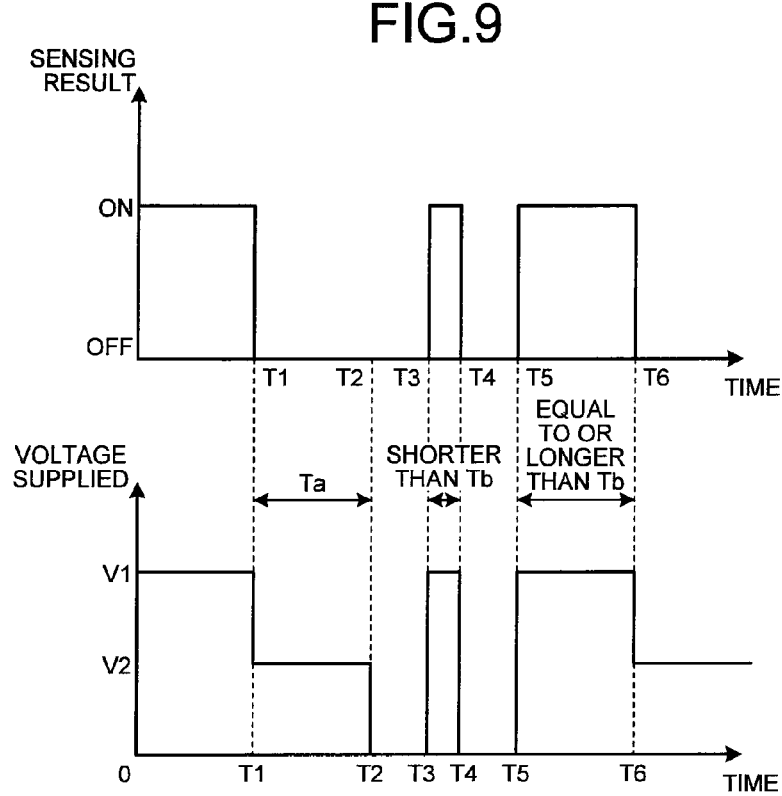
FIG. 9 illustrates an example of a control operation to be performed on a power supply to the light source in the microscope according to the fourth embodiment of the present invention.

Referring now to FIG. 9, a control operation to be performed by the control unit 412 on the power supply to the light source 410 is described. FIG. 9 shows the results of sensing operations performed by the observer sensor 413 in the microscope 401 of the fourth embodiment, and an example of the control operation performed by the control unit 412 on the power supply to the light source 410 in accordance with the results. The upper half of FIG. 9 shows the results of sensing operations performed by the observer sensor 413. The abscissa axis indicates time, and the ordinate axis indicates the results of sensing operations performed by the observer sensor 413. Where the result of a sensing operation is "ON", the presence of an observer is sensed. Where the result of a sensing operation is "OFF", the presence of an observer is not sensed. The lower half of FIG. 9 shows an example of the power supply to the light source 410. The abscissa axis indicates the elapsed time, and the ordinate axis indicates the voltage supplied to the light source 410. The voltage is shown as a parameter related to the power supply here, but the present invention is not particularly limited to that arrangement.

Between time 0 and time T1, an observer is observing the specimen 403. Since the observer is present in front of the microscope 401, the observer sensor 413 senses the observer, and transmits an electric signal to the control unit 412, with the electric signal indicating that there is an observer. Receiving the electric signal from the observer sensor 413, the control unit 412 determines that the observer is observing the specimen 403, and controls the supply voltage for the light source 410 to be a rated lighting voltage V1. In this manner, the control unit 412 puts the light source 410 into an ON state, to emit an optimum amount of illumination light for observation. The voltage supplied to the light source 410 is closely related to the amount of light emitted from the light source 410. To realize an optimum observation environment, the rated lighting voltage V1 can be adjusted by an observer in advance.

At time T1, the observer leaves the seat in front of the microscope 401, and suspends the observation. Since the observer is not present in front of the microscope 401 at this point, the observer sensor 413 transmits an electric signal to the control unit 412, with the electric signal indicating that there is not an observer. Receiving the electric signal from the observer sensor 413, the control unit 412 determines that the observation is suspended, and causes the time measuring unit 414 to start measuring the time te1 elapsed since time T1. The control unit 412 further controls the voltage to be supplied to the light source 410 to a standby voltage V2 (the standby voltage V2<the rated lighting voltage V1), and puts the light source 410 into a standby state in which the amount of illumination light to be emitted is restrained.

In FIG. 9, the standby voltage V2 is shown as approximately half the rated lighting voltage V1, but the standby voltage V2 is not particularly limited to that. Since the amount of light to be emitted from the light source is determined in accordance with the size of the supplied voltage, the standby voltage V2 should preferably be as low as possible to reduce the power consumption and protect the specimen. Meanwhile, to return to the ON state as quickly as possible when the observation is resumed, the standby voltage V2 should preferably be as high as possible, and be close to the rated lighting voltage V1. In the ON state, the optimum amount of light for observation is emitted.

In view of the above, the standby voltage V2 needs to be determined in good time, with a reduction in poser consumption, the specimen protection, and the quick return to the observation state being taken into consideration. In the microscope 401 of this embodiment, the standby voltage V2 can be adjusted like the rated lighting voltage V1.

Time T2 is the time when a predetermined period of time has passed since time T1. Here, between time T1 and time T2, the observer is not in the seat, and the observer sensor 413 constantly transmits an electric signal to the control unit 412, with the electric signal indicating that there is not an observer. At time T2, the elapsed time te1 since time T1 being measured by the time measuring unit 414 becomes equal to or longer than a predetermined standby time Ta, and therefore, the control unit 412 determines that the standby state of the light source 410 has lasted for a period of time equal to or longer than the standby time Ta. The control unit 412 then stops the voltage supply to the light source 410, and puts the light source 410 into an OFF state in which the light source 410 does not emit the illumination light.

If the observer resumes the observation between time T1 and time T2, the observer sensor 413 senses the presence of the observer, and transmits an electric signal to the control unit 412, with the electric signal indicating that there is an observer. Receiving the electric signal from the observer sensor 413, the control unit 412 determines that the observation has been resumed. The control unit 412 then controls the voltage to be supplied to the light source 410 to the rated lighting voltage V1, and puts the light source 410 into the ON state in which the light source 410 emits the optimum amount of light for observation.

As described above, after the observer sensor 413 senses the absence of an observer while the light source is in the ON state, the voltage to be supplied to the light source 410 is maintained at the standby voltage V2 (which is equal to or higher than 0, and is lower than the rated lighting voltage V1), and the light source 410 is maintained in the standby state until the predetermined period of time (the standby time Ta) has passed. In this manner, the power consumption is reduced, and the specimen is protected. Further, when the observation is resumed, the light source 410 is quickly returned into the ON state. After the predetermined period of time (the standby time Ta) has passed, the voltage supply to the light source 410 is stopped, so as to further reduce the power consumption and protect the specimen.

Next, an example of the control over the voltage supply to the light source in a case where the light source 410 does not need to be returned to the ON state, for example, a case where a person or the like simply cuts across in front of the microscope 401 between time T3 and time T4 is described. In this specification, the sensing of a subject by the observer sensor 413 where the light source 410 does not need to be returned to the ON state as described above will be hereinafter referred to as "excess sensing".

Time T3 is the time when excess sensing is performed by the observer sensor 413. At this point, the observer sensor 413 cannot determine whether the sensed subject is the observer who has returned to resume the observation or a person or the like who simply walks by. Therefore, the observer sensor 413 transmits an electric signal to the control unit 412, with the electric signal indicating that there is an observer, as in the control operation performed between time 0 and time T1. The control unit 412 then determines that the observation has been resumed, and causes the time measuring unit 414 firstly to start measuring the time te2 elapsed since time T3. The control unit 412 further controls the voltage to be supplied to the light source 410 to the rated lighting voltage V1, and puts the light source 410 into the ON state in which the light source 410 emits the optimum amount of light for observation.

In reality, however, a person or the like simply cuts across in front of the microscope 401. Therefore, the sensed subject quickly walks past the microscope 401, and moves out of the sensing area of the observer sensor 413. At time T4 when the sensed subject moves out of the sensing area of the observer sensor 413, the observer sensor 413 transmits an electric signal to the control unit 412, with the electric signal indicating that there is not an observer. Receiving the electric signal, the control unit 412 determines whether the elapsed time te2 being measured by the time measuring unit 414 exceeds a minimum observation time Tb. Here, the elapsed time te2 being measured (the time during which the light source has been maintained in the ON state) is shorter than the minimum observation time Tb. Therefore, the control unit 412 determines that the subject sensed by the observer sensor 413 is not the observer resuming the observation, and promptly stops the voltage supply to the light source 410, to put the light source 410 into the OFF state.

As described above, where the light source 410 is in the OFF state, the light source 410 is returned to the ON state immediately after the observer sensor 413 senses a subject whether or not the sensing is excess sensing. Accordingly, the time required for the observer to resume the observation is shortened to the minimum, and the light source can be quickly returned to the ON state. In this embodiment, a check is made to determine whether the sensing is excess sensing, with the minimum observation time Tb being the criterion. More specifically, if the time during which the sensed subject has been sensed by the observer sensor 413 is shorter than the minimum observation time Tb, the sensing is determined to be excess sensing (or the light source 410 should not have been returned to the ON state), and the light source 410 is put into the OFF state without a standby period. In this manner, the unnecessary voltage supply is minimized. Also, the power consumption is reduced, and the specimen is protected.

Time T5 is the time when the observer resumes the observation. As in the process at time T3, the observer sensor 413 transmits an electric signal to the control unit 412, with the electric signal indicating that there is an observer. Accordingly, the control unit 412 determines that the observation has been resumed, and causes the time measuring unit 414 to start measuring the time te2 elapsed since time T5. The control unit 412 also puts the light source 410 into the ON state.

Since the observer has actually resumed the observation, the light source 410 is maintained in the ON state at time T6 when the observer next leaves the seat after the minimum observation time Tb has passed. Therefore, at time T6, the control unit 412 puts the light source 410 into the standby state, as in the process at time T1.

Figure 10:
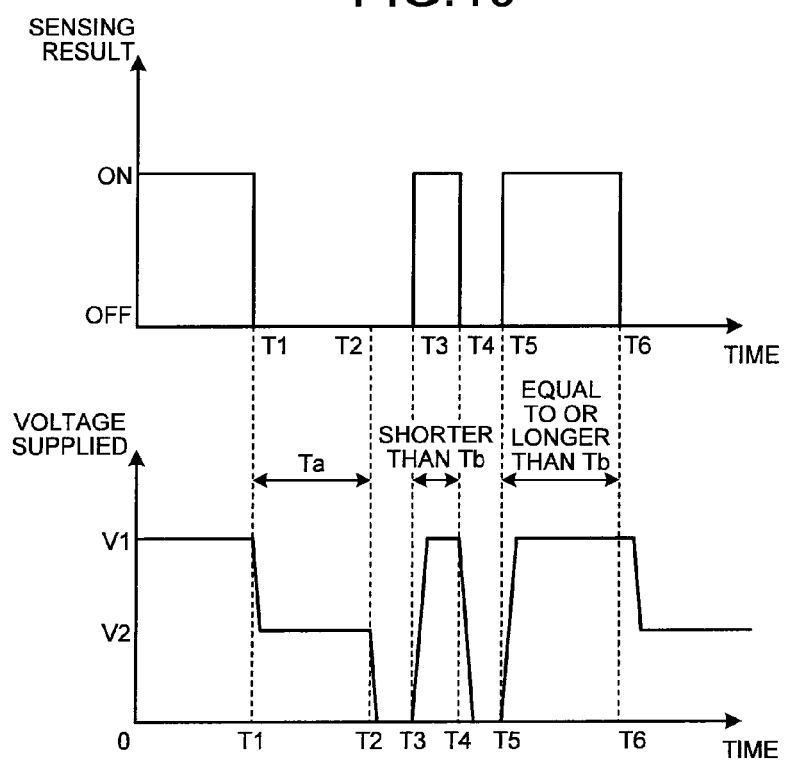
FIG. 10 illustrates a modified example of the control operation to be performed on the power supply to the light source in the microscope according to the fourth embodiment of the present invention.

FIG. 10 shows the results of a sensing operation performed by the observer sensor 413 in the microscope 401 of this embodiment, and a modification of the control operation performed by the control unit 412 on the power supply to the light source 410. Although voltage is again shown as a parameter related to the power supply, the present invention is not particularly limited to that.

FIG. 10 is the same as FIG. 9, except for the method of changing the supply voltage. In FIG. 9, the supply voltage is instantly changed. For example, at time T1, the supply voltage is instantly changed from the rated lighting voltage V1 to the standby voltage V2. It is known that the rapid change in the supply voltage in such a short time adversely affect the life of the light source in general. Particularly, when the light source is a halogen lamp or the like, this problem is more serious.

To counter such a problem, the supply voltage is gradually increased or reduced in FIG. 10. For example, at time T1, the voltage is gradually reduced from the rated lighting voltage V1 to the standby voltage V2. In this manner, by controlling the voltage supply, the load on the light source 410 can be reduced, and the life of the light source 410 can be appropriately secured.

Figure 11:
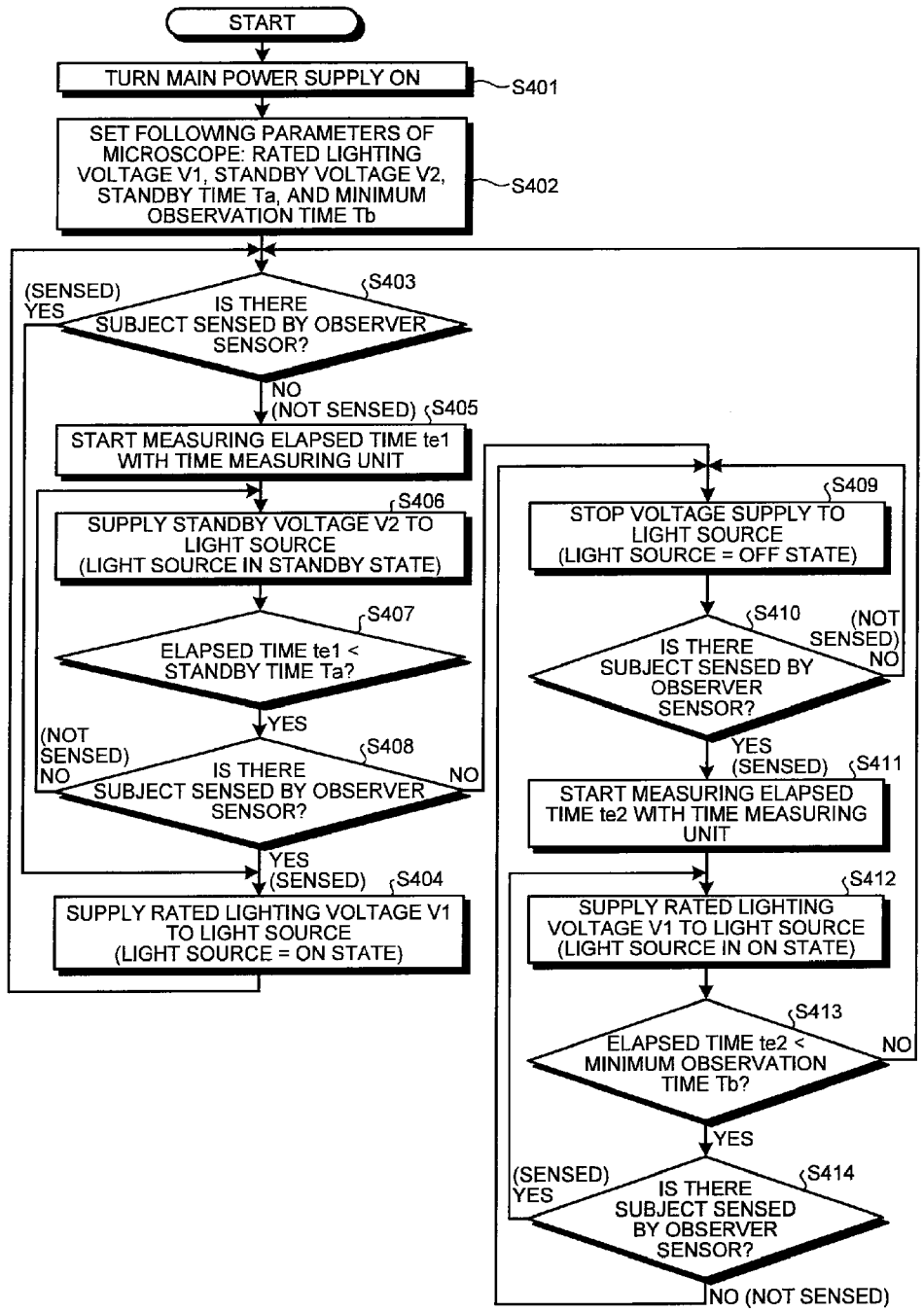
FIG. 11 is a flowchart showing the example of the control operation to be performed on the power supply to the light source in the microscope according to the fourth embodiment of the present invention.

FIG. 11 is a flowchart showing an example of the control operation to be performed on the power supply to the light source 410 of the microscope 401 according to this embodiment. FIG. 11 shows a control flow for realizing the control operations illustrated in FIGS. 9 and 10. Referring to FIG. 11, the flow of the control operation to be performed on the power supply to the light source 410 is described. Although voltage is again shown as a parameter related to the power supply, the present invention is not particularly limited to that.

As shown in the example illustrated in FIG. 11, the control over the power supply to the light source 410 is started by turning on the main power supply 411 of the microscope 401 (step S401). At step S402, the initial setting is performed in the microscope 401. More specifically, the following values are set: the rated lighting voltage V1 in the ON state of the light source 410, the standby voltage V2 in the standby state of the light source 410, the standby time Ta as the upper limit of the time period in which the light source 410 is kept in the standby state, and the minimum observation time Tb as the criterion for resuming observation. At this step, predetermined values of the above parameters may be automatically set, or an observer may manually set the values of the above parameters.

At step S403, a check is made to determine whether a subject is sensed by the observer sensor 413. If the determination result is "YES" (if a subject is sensed by the observer sensor 413), the operation moves on to step S404. If the determination result is "NO" (if not a subject is sensed by the observer sensor 413), the operation moves on to step S405.

Since a subject is sensed by the observer sensor 413, the rated lighting voltage V1 is supplied to the light source 410 at step S404. As a result, the light source 410 is put into the ON state in which the light source 410 emits the optimum amount of light for observation. After that, the operation returns to step S403, and the above procedures are repeated.

The repeated procedures of steps S403 and S404 are equivalent to the control operation performed between time 0 and time T1 shown in FIG. 9. More specifically, in the operation flow shown in steps S403 and S404, a subject is sensed by the observer sensor 413, and the light source 410 is maintained in the ON state.

At step S405, the time measuring unit 414 is activated to start measuring the time te1 elapsed since the time when the subject stops being sensed by the observer sensor 413. At step S406, the standby voltage V2 is supplied to the light source 410. As a result, the light source 410 is put into the standby state in which the amount of light emission is reduced.

At step S407, a check is made to determine whether the elapsed time te1 being measured by the time measuring unit 414 is shorter than the standby time Ta set at step S402. If the determination result is "YES" (if the elapsed time te1 is shorter than the standby time Ta), the operation moves on to step S408. If the determination result is "NO" (if the elapsed time te1 is equal to or longer than the standby time Ta), the operation moves on to step S409.

At step S408, a check is again made to determine whether a subject is sensed by the observer sensor 413. If the determination result is "YES", the operation moves on to step S404. If the determination result is "NO", the operation moves on to step S406.

Where the determination result at step S408 is "YES", the observer has resumed the observation before the standby time Ta has passed since the suspension of the observation. The operation moves on to step S404, and the light source 410 is quickly returned to the ON state in which the light source 410 emits the optimum amount of light for observation.

The repeated procedures of steps S406 through S408 are equivalent to the control operation performed between time T1 and time T2 shown in FIG. 9. More specifically, in the operation flow shown as the repeated procedures of steps S406 through S408, there is not a subject sensed by the observer sensor 413, and the light source 410 is maintained in the standby state.

At step S409, when the standby time Ta has passed since the subject stopped being sensed by the observer sensor 413, the voltage supply to the light source 410 is stopped, and the light source 410 is put into the OFF state.

At step S410, a check is again made to determine whether a subject is sensed by the observer sensor 413. If the determination result is "YES", the operation moves on to step S411. If the determination result is "NO", the operation moves on to step S409.

The repeated procedures of steps S409 and S410 are equivalent to the control operation performed between time T2 and time T3 shown in FIG. 9. More specifically, in the operation flow shown in steps S409 and S410, there is not a subject sensed by the observer sensor 413, and the light source 410 is maintained in the OFF state after the standby time Ta has passed.

At step S411, the time measuring unit 414 is activated to start measuring the time te2 elapsed since the subject started being sensed by the observer sensor 413. At step S412, the rated lighting voltage V1 is supplied to the light source 410. As a result, the light source 410 is put into the ON state in which the light source 410 emits the optimum amount of light for observation.

At step S413, a check is made to determine whether the elapsed time te2 being measured by the time measuring unit 414 is shorter than the minimum observation time Tb set at step S402. If the determination result is "YES" (if the elapsed time te2 is shorter than the minimum observation time Tb), the operation moves on to step S414. If the determination result is "NO" (if the elapsed time te2 is equal to or longer than the minimum observation time Tb), the operation moves on to step S403.

At step S414, a check is again made to determine whether a subject is sensed by the observer sensor 413. If the determination result is "YES", the operation moves on to step S412. If the determination result is "NO", the operation moves on to step S409.

The repeated procedures of steps S412 through S414 are equivalent to the control operation performed between time T3 and time T4 shown in FIG. 9. More specifically, in the operation flow shown in steps S412 through S414, a subject is sensed by the observer sensor 413, and the light source 410 is returned from the OFF state to the ON state, before the minimum observation time Tb has passed.

The procedure to move on to step S409 when the determination result at step S414 becomes "NO" before the minimum observation time Tb has passed is equivalent to the control operation performed at time T4 in FIG. 9. More specifically, this procedure is equivalent to the situation where the light source 410 is temporarily returned to the ON state due to excess sensing.

The procedure to move on to step S403 when the determination result at step S413 becomes "NO" after the minimum observation time Tb has passed is carried out between time T5 and time T6 in FIG. 9. Accordingly, even if the result of the sensing by the observer sensor 413 becomes "NO" thereafter, the light source 410 does not transit directly to the OFF state, but transits to the standby state.

As described above, the microscope 401 of this embodiment includes the light source 410, the observer sensor 413, and the time measuring unit 414. The light source 410 can be put into the ON state, the OFF state, or the standby state. In the microscope 401 of this embodiment, if the observer sensor 413 stops sensing a subject after a predetermined period (the minimum observation time Tb) of observation, the light source 410 can be maintained in the standby state only for a predetermined period of time (the standby time Ta). Accordingly, where the observation is resumed within the predetermined period of time (the standby time Ta) after the suspension of the observation, the light source 410 can be quickly returned to the ON state to instantly resume the observation. Accordingly, the operability of the microscope 401 is increased. Also, the supply voltage in the standby state is restricted to a lower amount than the supply voltage in the ON state, and the voltage supply is stopped after the predetermined period of time (the standby time Ta) has passed. As a result, the light source 410 is automatically put into the OFF state. Accordingly, power saving is also performed.

In the microscope 401 of this embodiment, if the observer sensor 413 senses a subject after the light source 410 is temporarily put into the OFF state, the light source 410 is instantly returned to the ON state, whether or not the sensing is excess sensing. If the sensing is ended within a predetermined period of time (the minimum observation time Tb), the sensing is determined to be excess sensing, and the light source 410 is put directly into the OFF state. Accordingly, resuming the observation requires only the minimum amount of time to cause the light source 410 to transit from the OFF state to the ON state. In this manner, the operability of the microscope 401 is increased. Further, in the case of excess sensing, the light source 410 is automatically put into the OFF state, so that unnecessary power consumption can be minimized.

Fifth Embodiment

Referring now to FIG. 5, the structure of a microscope according to an embodiment is described.

Figure 12:
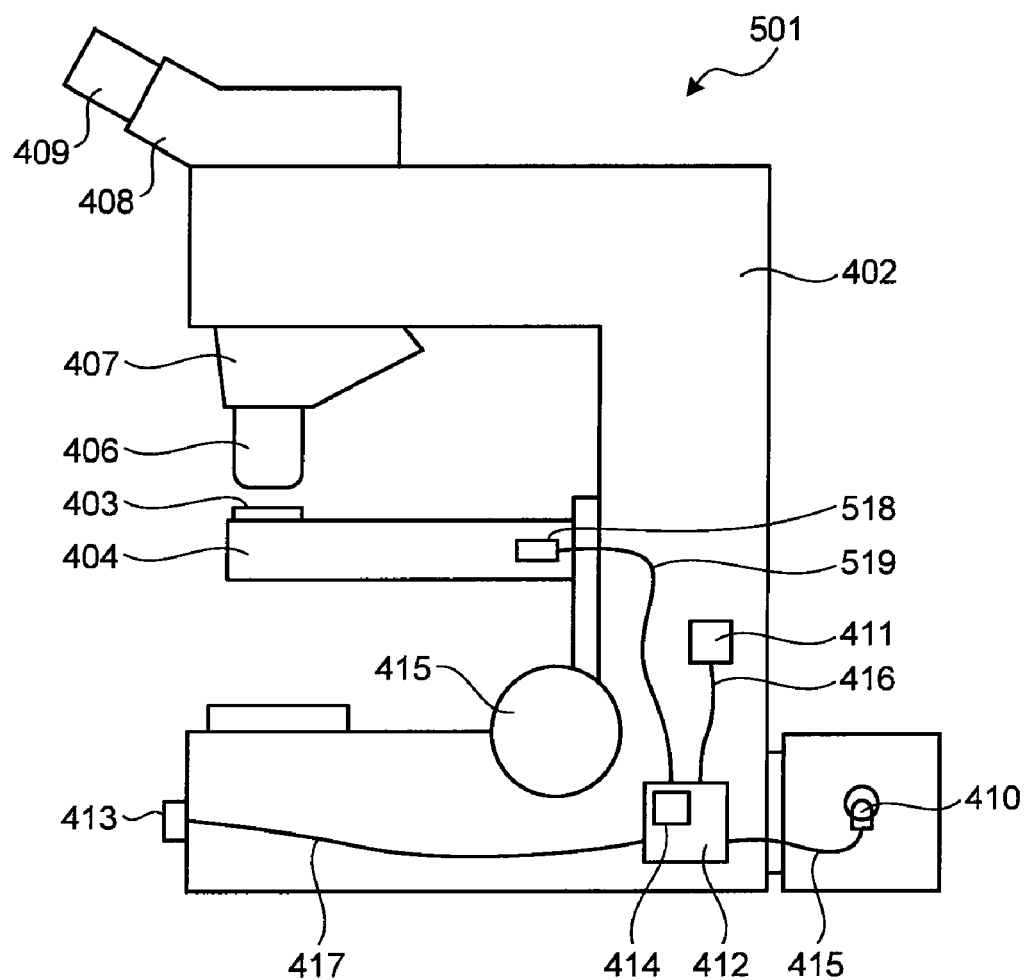
FIG. 12 shows an example structure of a microscope according to a fifth embodiment of the present invention.

FIG. 12 shows an example structure of the microscope according to this embodiment. Many of the components of a microscope 501 illustrated in FIG. 5 are the same as those of the microscope 401 illustrated in FIG. 8. Therefore, the same components as those of the fourth embodiment are denoted by the same reference numerals as those in FIG. 8, and explanation of them is omitted herein.

The microscope 501 illustrated in FIG. 5 is the same as the microscope 401 illustrated in FIG. 8, except that an observing operation sensor 518 (a second sensor) is added and is connected to the control unit 412 via a signal line 519.

The observing operation sensor 518 is attached to the inside of the stage 404 of the microscope 501, and includes an acceleration sensor or the like for detecting displacement, for example. With this arrangement, the observing operation sensor 518 determines whether the stage 404 has moved in an observing operation. More specifically, where the stage 404 has moved in a plane perpendicular to the optical axis or moves in the optical axis direction, the observing operation sensor 518 transmits an electric signal to the control unit 412 via the signal line 519, with the electric signal indicating that an observing operation has been performed. When the stage 404 is in a resting state, the observing operation sensor 518 transmits an electric signal to the control unit 412 via the signal line 519, with the electric signal indicating that an observing operation has not been performed.

Although an electric signal is transmitted from the observing operation sensor 518 to the control unit 412 whether or not there is an observer in the above example case, the present invention is not limited to that arrangement. For example, only where an observing operation has been performed (or only where an observing operation has not been performed), an electric signal may be transmitted to notify the control unit 412 that an observing operation has been performed (or not).

Figure 13:
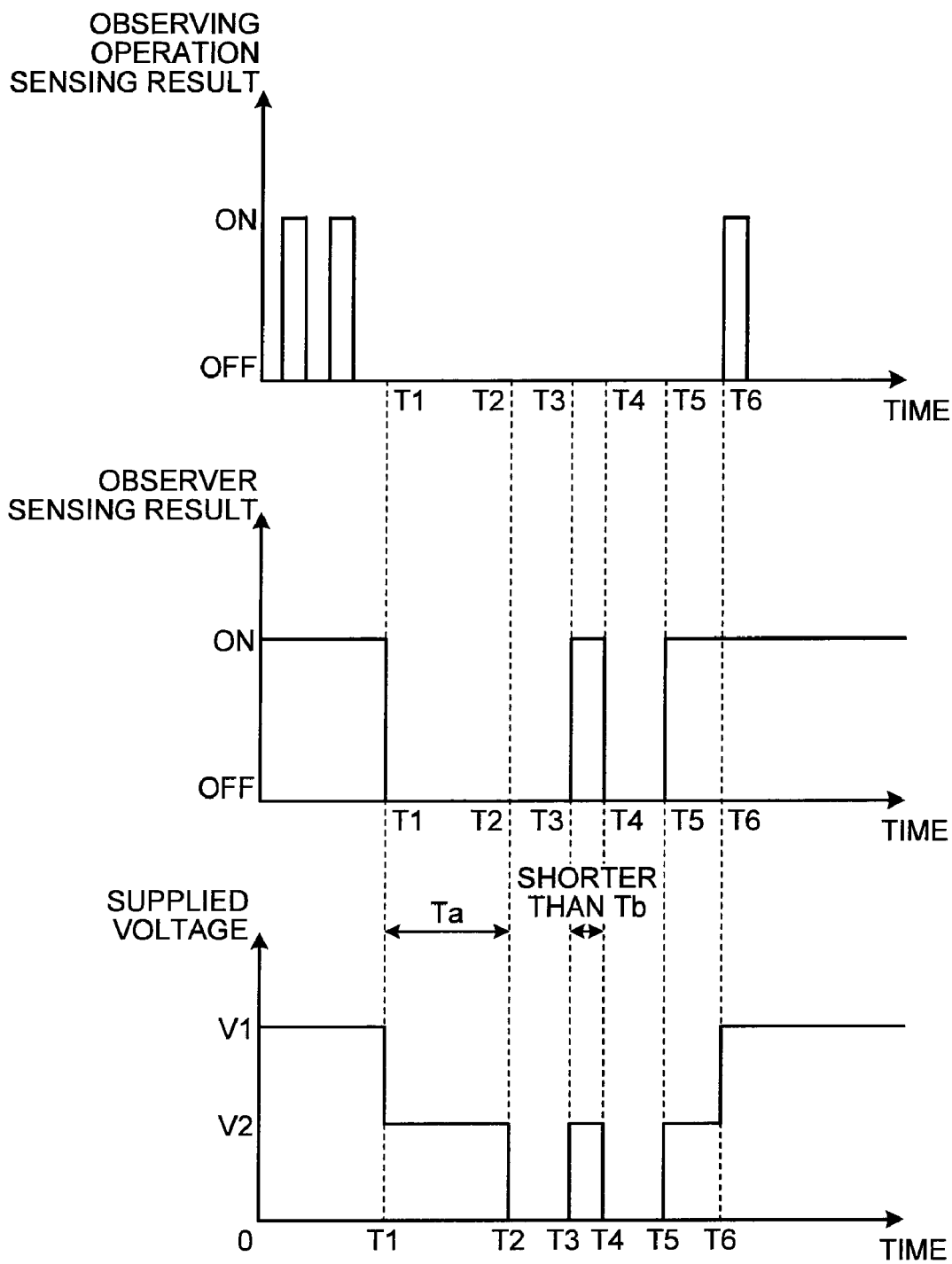
FIG. 13 illustrates an example of a control operation to be performed on a power supply to a light source in the microscope according to the fifth embodiment of the present invention.

Referring now to FIG. 13, a control operation to be performed by the control unit 412 on the power supply to the light source 410 is described. FIG. 13 shows the results of sensing operations performed by the observer sensor 413 and the observing operation sensor 518 in the microscope 501 of this embodiment, and an example of the control operation performed by the control unit 412 on the power supply to the light source 410 in accordance with the results. The upper part of FIG. 13 shows the results of sensing operations performed by the observing operation sensor 518. The abscissa axis indicates time, and the ordinate axis indicates the results of sensing operations performed by the observing operation sensor 518. Where the result of a sensing operation is "ON", an observing operation is sensed. Where the result of a sensing operation is "OFF", not an observing operation is sensed. The middle part of FIG. 13 shows the results of sensing operations performed by the observer sensor 413. The abscissa axis indicates time, and the ordinate axis indicates the results of sensing operations performed by the observer sensor 413. Where the result of a sensing operation is "ON", the presence of an observer is sensed. Where the result of a sensing operation is "OFF", the presence of an observer is not sensed. The lower part of FIG. 13 shows an example of the power supply to the light source 410. The abscissa axis indicates the elapsed time, and the ordinate axis indicates the voltage supplied to the light source 410. The voltage is shown as a parameter related to the power supply here, but the present invention is not particularly limited to that arrangement.

The control operation performed between time 0 and time T2 are the same as the control operations illustrated in FIG. 9, and therefore explanation of them is omitted herein. An example of the control operation to be performed on the voltage supply to the light source 410 between time T3 and T4 in the case of excess sensing is described.

Time T3 is the time when excess sensing is performed by the observer sensor 413. At this point, the observer sensor 413 cannot determine whether the sensed subject is the observer resuming the observation or merely a person who happens to walk by. Therefore, the observer sensor 413 transmits an electric signal to the control unit 412, with the electric signal indicating that there is an observer. Receiving the electric signal, the control unit 412 causes the time measuring unit 414 to start measuring the time te2 elapsed since time T3. Unlike the control unit 412 of the fourth embodiment, the control unit 412 of this embodiment further controls the supply voltage to the light source 410 to be the standby voltage V2, and puts the light source 410 into the standby state.

Since the above sensing is resulted from a person or the like simply cutting across in front of the microscope 501, the sensed subject quickly walks past the microscope 501, and moves out of the sensing area of the observer sensor 413. Therefore, at time T4 when the sensed subject moves out of the sensing area of the observer sensor 413, the observer sensor 413 transmits an electric signal to the control unit 412, with the electric signal indicating that there is not an observer. The control unit 412 then determines that the subject sensed by the observer sensor 413 is not the observer who is resuming the observation, and stops the voltage supply to the light source 410. As a result, the light source 410 is put into the OFF state.

As described above, if the observer sensor 413 senses a subject while the light source 410 is in the OFF state, the light source 410 is temporarily put into the standby state. With this arrangement, the unnecessary voltage supply and the amount of light emitted from the light source 410 in the case of excess sensing can be minimized, compared with a case that the light source 410 is put directly into the ON state. Accordingly, power saving can be performed, and the specimen 403 can be protected from excess emission of illumination light.

Time T5 is the time when the observer resumes the observation. At this point, the observer sensor 413 transmits an electric signal to the control unit 412, with the electric signal indicating that there is an observer, as in the control operation performed at time T3. The control unit 412 first causes the time measuring unit 414 to start measuring the time elapsed since time T5, and then puts the light source 410 into the standby state.

Since the observer has actually resumed the observation here, the observer performs an observing operation such as moving the stage 404. Time T6 is the time when the observer moves the stage 404 as an observing operation. At this point, the observing operation sensor 518 senses that an observing operation has been performed by moving the stage 404. The observing operation sensor 518 then transmits an electric signal to the control unit 412 via the signal line 519, with the electric signal indicating that an observing operation has been performed. Receiving the electric signal, the control unit 412 controls the supply voltage for the light source 410 to be the rated lighting voltage V1, and puts the light source 410 into the ON state.

As described above, after the light source 410 is temporarily returned to the standby state, the light source 410 is quickly returned to the ON state, with an observing operation being the trigger. In this manner, the optimum illumination state for observation can be provided when observation is resumed, without unnecessary power consumption.

In the above described example case, the light source 410 transits from the standby state to the ON state when an observing operation is performed. Alternatively, if the light source 410 is maintained in the standby state over a predetermined period of time (the minimum observation time Tb) after transiting from the OFF state, the light source 410 is also put into the ON state. In this manner, the optimum illumination state for observation can be provided after a predetermined period of time has passed since the start of the observation, even if there is no need to perform an observing operation at all.

If the observer sensor 413 transmits an electric signal indicating that there is not an observer to the control unit 412 before the predetermined period of time (the minimum observation time Tb) has passed, due to excess sensing or the like, the voltage supply to the light source 410 is stopped, and the light source 410 is put into the OFF state, as in the fourth embodiment.

In this embodiment, the observing operation sensor 518 is attached to the stage 404, and senses an observing operation accompanied by movement of the stage 404. With the observing operation being the trigger, the light source 410 is returned to the ON state. However, the present invention is not limited to that arrangement. The observing operation sensor 518 may be attached to any of the operating units that might be operated during an observing operation, such as the focusing unit 405 operated in an focus adjustment operation, the revolver 407 operated to switch the objective lenses 406, and a filter cube designed to exchange filters (not shown) for adjusting the illumination light, as well as the stage 404. With this arrangement, observing operations other than the moving of the stage 404 can be sensed. Accordingly, the optimum illumination state can be provided with higher precision when observation is resumed.

The supply voltage for the light source 410 may be gradually increased or reduced in this embodiment, as in the modification of the fourth embodiment illustrated in FIG. 10. With this arrangement, adverse influence on the life of the light source 410 can be restrained, as in the modification of the fourth embodiment.

Figure 14:
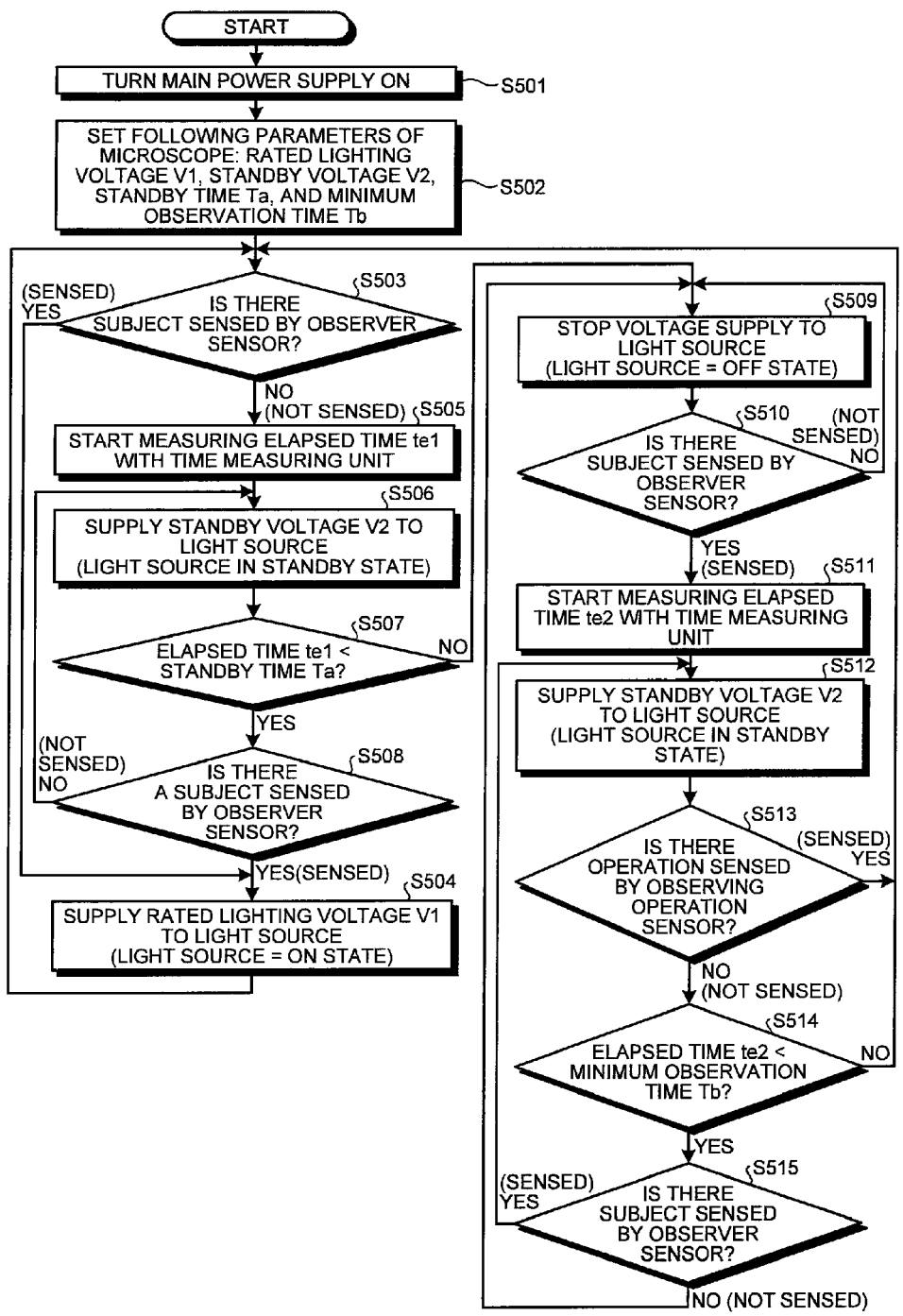
FIG. 14 is a flowchart showing the example of the control operation to be performed on the power supply to the light source in the microscope according to the fifth embodiment of the present invention.

FIG. 14 is a flowchart showing an example of a control operation to be performed on the power supply to the light source in the microscope according to this embodiment. FIG. 14 shows the control flow for performing the control operation illustrated in FIG. 13. Referring to FIG. 14, the flow of the control operation to be performed on the power supply to the light source 410 is described below. Although voltage is again shown as a parameter related to the power supply, the present invention is not particularly limited to that.

In the flowchart shown in FIG. 14, the procedures up to step S510 are the same as the corresponding procedures in the flowchart shown in FIG. 11, and therefore, explanation of them is omitted herein. If the observer sensor 413 senses a subject at step S510 after the light source 410 is put into the OFF state at step S509, the operation moves on to step S511.

At step S511, the time measuring unit 414 is activated to start measuring the time te2 elapsed since the subject is sensed by the observer sensor 413. At step S512, the standby voltage V2 is supplied to the light source 410. As a result, the light source 410 is put into the standby state.

At step S513, a check is made to determine whether the observing operation sensor 518 has sensed an observing operation such as moving the stage 404. If the determination result is "YES" (if the observing operation sensor 518 has sensed an observing operation), the operation moves on to step S503, and the light source 410 is put into the ON state at step S504. If the determination result is "NO" (if there is not an observing operation sensed by the observing operation sensor 518), the operation moves on to step S514.

At step S514, a check is made to determine whether the elapsed time te2 being measured by the time measuring unit 414 is shorter than the minimum observation time Tb set at step S502. If the determination result is "YES" (if the elapsed time te2 is shorter than the minimum observation time Tb), the operation moves on to step S515. If the determination result is "NO" (if the elapsed time te2 is equal to or longer than the minimum observation time Tb), the operation moves on to step S503, and the light source 410 is put into the ON state at step S504.

At step S515, a check is again made to determine whether a subject has been sensed by the observer sensor 413. If the determination result is "YES", the operation moves on to step S512. If the determination result is "NO", the operation moves on to step S509.

The repeated procedures of steps S512 through S515 are equivalent to the control operation between the time T3 and time T4 in FIG. 13. More specifically, in the operation flow shown in steps S512 through S515, a subject is sensed by the observer sensor 413, and the light source 410 transits from the OFF state to the standby state, before the minimum observation time Tb has passed.

The procedure to move on to step S509 when the determination result at step S515 becomes "NO" before the minimum observation time Tb has passed is equivalent to the control operation performed at time T4 in FIG. 13. More specifically, this procedure is equivalent to the situation where the light source 410 temporarily transits to the standby state due to excess sensing.

The procedure to move on to step S503 when the determination result at step S514 becomes "NO" after the minimum observation time Tb has passed is not illustrated in FIG. 13. Accordingly, this procedure is equivalent to the control operation to return the light source 410 to the ON state after a predetermined period of time (the minimum observation time Tb) has passed, in case a resumption of observation is not accompanied by an observing operation.

The procedure to move on to step S503 when the determination result at step S513 becomes "YES" is equivalent to the control operation performed at time T6 in FIG. 13. Accordingly, this procedure is equivalent to the control operation to return the light source 410 from the standby state to the ON state after the observing operation sensor 518 senses an observing operation such as moving of the stage 404.

As described above, the microscope 501 of this embodiment includes the observing operation sensor 518, as well as the components of the microscope 401 of the fourth embodiment. In the microscope 501 of this embodiment, if the observer sensor 413 stops sensing a subject after a predetermined period (the minimum observation time Tb) of observation, the light source 410 can be maintained in the standby state only for a predetermined period of time (the standby time Ta). Accordingly, where the observation is resumed within the predetermined period of time (the standby time Ta) after the suspension of the observation, the light source 410 is quickly returned to the ON state, and the observation is instantly resumed. Accordingly, the operability of the microscope 501 is increased. Also, the supply voltage in the standby state is restricted to a lower amount than the supply voltage in the ON state, and the voltage supply is stopped after the predetermined period of time (the standby time Ta) has passed. As a result, the light source 410 is automatically put into the OFF state. Accordingly, power saving is also performed.

In the microscope 501 of this embodiment, if the observer sensor 413 senses a subject after the light source 410 is temporarily put into the OFF state, the light source 410 is instantly returned to the standby state, whether or not the sensing is excess sensing. With an observing operation accompanying a resumption of observation being the trigger, the light source 410 can be quickly returned to the ON state from the standby state. In this manner, the optimum illumination environment can be provided when observation is resumed, without unnecessary power consumption. Accordingly, the operability of the microscope 501 is increased.

If a subject is continued to be sensed over the predetermined period of time (the minimum observation time Tb) after the observer sensor 413 senses the subject, the light source 410 is returned to the ON state from the standby state. In this manner, the optimum illumination environment can be automatically provided after the predetermined period of time (the minimum observation time Tb) has passed, even if a resumption of observation is not accompanied by an observing operation. Accordingly, observation can be resumed.

Further, if a subject stops being sensed within the predetermined period of time (the minimum observation time Tb) after the observer sensor 413 senses the subject, the sensing is determined to be excess sensing, and the light source 410 is automatically put directly into the OFF state. In this manner, unnecessary power consumption can be minimized.

Sixth Embodiment

Figure 15:
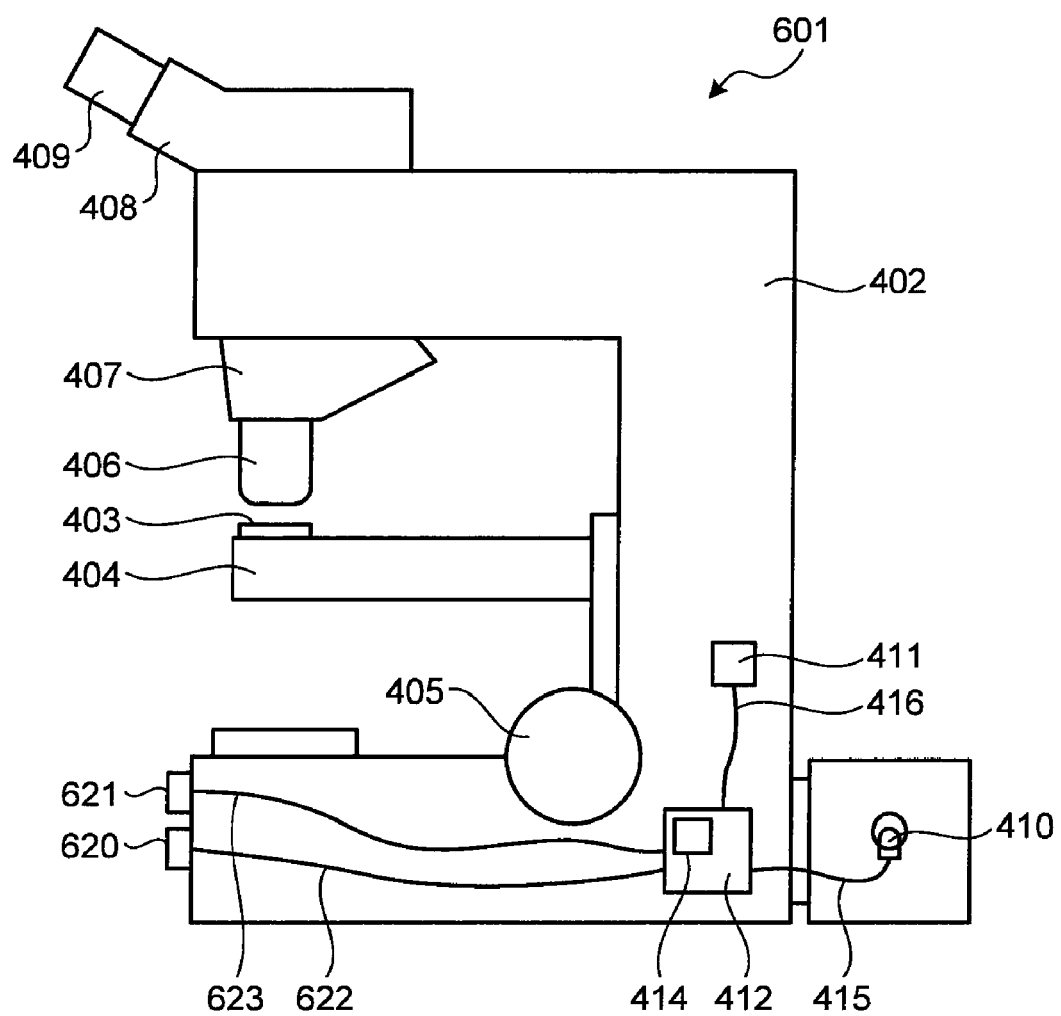
FIG. 15 shows an example structure of a microscope according to a sixth embodiment of the present invention.

Referring now to FIG. 15, the structure of a microscope according to this embodiment is described. FIG. 15 illustrates an example structure of the microscope according to this embodiment. Many of the components of a microscope 601 illustrated in FIG. 15 are the same as those of the microscope 401 illustrated in FIG. 8. Therefore, the same components as those shown in FIG. 8 are denoted by the same reference numerals as those shown in FIG. 8, and explanation of them is omitted herein.

The microscope 601 illustrated in FIG. 15 has a short-distance observer sensor 620 (a third sensor) and a long-distance observer sensor 621 (a fourth sensor), instead of the observer sensor 413 of the microscope 401 illustrated in FIG. 8. The short-distance observer sensor 620 and the long-distance observer sensor 621 are connected to the control unit 412 via signal lines 622 and 623, respectively.

The short-distance observer sensor 620 and the long-distance observer sensor 621 are formed with sensors utilizing infrared rays or ultrasonic waves, for example. The short-distance observer sensor 620 performs sensing operations in a front region relatively close to the short-distance observer sensor 620. The long-distance observer sensor 621 performs sensing operations in farther regions as well as in the sensing area of the short-distance observer sensor 620. More specifically, when the short-distance observer sensor 620 senses a subject, the short-distance observer sensor 620 transmits an electric signal to the control unit 412 via the signal line 622, with the electric signal indicating that there is an observer in the vicinity of the microscope. When the long-distance observer sensor 621 senses a subject, the long-distance observer sensor 621 transmits an electric signal to the control unit 412 via the signal line 623, with the electric signal indicating that there is an observer present within a certain area including the vicinity region of the microscope.

Although the short-distance observer sensor 620 and the long-distance observer sensor 621 are described as separate components in the above description, the present invention is not particularly limited to that arrangement. Instead of the short-distance observer sensor 620 and the long-distance observer sensor 621, a single sensor that can provide the above described functions may be used.

Figure 16:
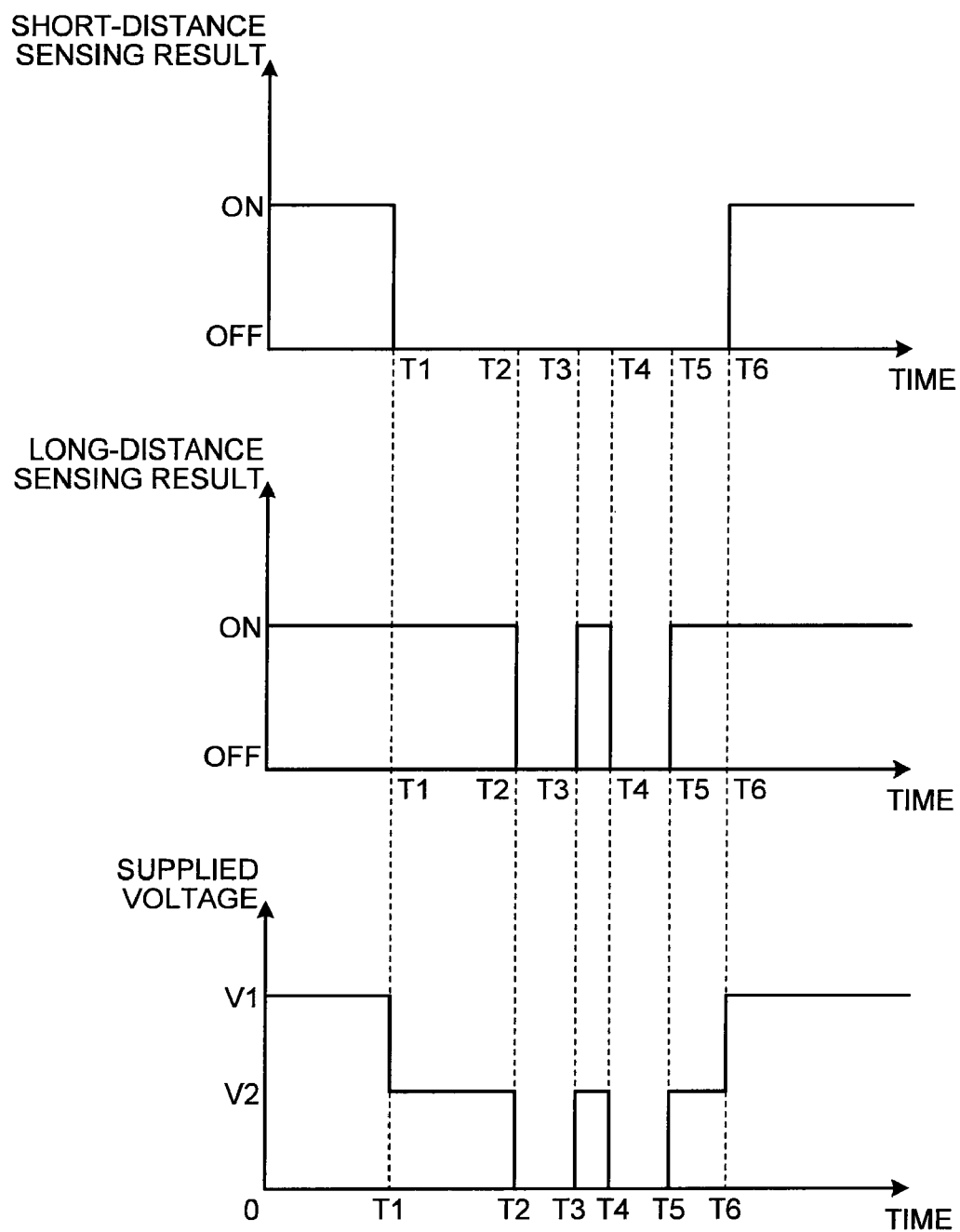
FIG. 16 illustrates an example of a control operation to be performed on a power supply to a light source in the microscope according to the sixth embodiment of the present invention.

Referring now to FIG. 16, a control operation to be performed by the control unit 412 on the power supply to the light source 410 is described. FIG. 9 shows the results of sensing operations performed by the short-distance observer sensor 620 and the long-distance observer sensor 621 in the microscope 601 of this embodiment, and an example of the control operation performed by the control unit 412 on the power supply to the light source 410 in accordance with the results. The upper part of FIG. 16 shows the results of sensing operations performed by the short-distance observer sensor 620.

The abscissa axis indicates time, and the ordinate axis indicates the results of sensing operations performed by the short-distance observer sensor 620. The middle part of FIG. 16 shows the results of sensing operations performed by the long-distance observer sensor 621. The abscissa axis indicates time, and the ordinate axis indicates the results of sensing operations performed by the long-distance observer sensor 621. In each of the upper and middle parts of FIG. 16, where the result of a sensing operation is "ON", the presence of an observer is sensed. Where the result of a sensing operation is "OFF", the presence of an observer is not sensed. The lower part of FIG. 16 shows an example of the power supply to the light source 410. The abscissa axis indicates the elapsed time, and the ordinate axis indicates the voltage supplied to the light source 410. The voltage is again shown as a parameter related to the power supply here, but the present invention is not particularly limited to that.

Between time 0 and time T1, an observer is observing the specimen 403. Since the observer is present in front of the microscope 601 at this point, the short-distance observer sensor 620 and the long-distance observer sensor 621 each senses the observer, and transmits an electric signal to the control unit 412, with the electric signal indicating that there is an observer. Receiving those electric signals from the short-distance observer sensor 620 and the long-distance observer sensor 621, the control unit 412 determines that the specimen 403 is being observed. The control unit 412 then controls the supply voltage for the light source 410 to be the rated lighting voltage V1, and puts the light source 410 into the ON state in which the light source 410 emits the optimum amount of light for observation.

Time T1 is the time when the observer suspends the observation and walks away from the microscope 601. At this point, the observer is located outside the sensing area of the short-distance observer sensor 620, but still remains within the sensing area of the long-distance observer sensor 621. Accordingly, the short-distance observer sensor 620 senses that there is not an observer, and transmits an electric signal to the control unit 412, with the electric signal indicating that there is not an observer. On the other hand, the long-distance observer sensor 621 continues to sense the observer, and transmits an electric signal to the control unit 412, with the electric signal indicating that there is an observer. Receiving those electric signals from the short-distance observer sensor 620 and the long-distance observer sensor 621, the control unit 412 determines that the observation is suspended. The control unit 412 then controls the supply voltage for the light source 410 to be the standby voltage V2 (the standby voltage V2<the rated lighting voltage V1), and puts the light source 410 into the standby state in which light emission is restrained.

Time T2 is the time when the observer moves out of the sensing area of the long-distance observer sensor 621. Here, an example case where the observer is located outside the sensing area of the short-distance observer sensor 620 but remains within the sensing area of the long-distance observer sensor 621 between time T1 and time T2 is described. At time T2, the short-distance observer sensor 620 and the long-distance observer sensor 621 each transmits an electric signal to a control unit 412, with the electric signal indicating that there is not an observer. Receiving those electric signals from the short-distance observer sensor 620 and the long-distance observer sensor 621, the control unit 412 stops the voltage supply to the light source 410, and puts the light source 410 into the OFF state.

In another example case, the observer returns into the sensing area of the short-distance observer sensor 620 between time T1 and time T2, and the short-distance observer sensor 620 transmits an electric signal to the control unit 412, with the electric signal indicating that there is an observer. In this case, the control unit 412 determines that the observation has been resumed, controls the supply voltage for the light source 410 to be the rated lighting voltage V1, and puts the light source 410 into the ON state.

An example of the control operation to be performed on the voltage supply to the light source between time T3 and time T4 in the case of excess sensing is now described. Time T3 is the time when excess sensing is performed by the long-distance observer sensor 621. At this point, the long-distance observer sensor 621 cannot determine whether the sensed subject is the observer resuming the observation or merely a person who happens to pass by. Therefore, the long-distance observer sensor 621 transmits an electric signal to the control unit 412, with the electric signal indicating that there is an observer. Receiving the electric signal, the control unit 412 controls the supply voltage for the light source 410 to be the standby voltage V2, and puts the light source 410 temporarily into the standby state. Meanwhile, the short-distance observer sensor 620 continues to transmit an electric signal to the control unit 412, with the electric signal indicating that there is not an observer.

Since the above sensing is resulted from a person or the like who simply cut across in front of the microscope 601, the sensed subject quickly walks past the microscope 601, and moves out of the sensing area of the long-distance observer sensor 621. Therefore, at time T4 when the sensed subject moves out of the sensing area of the long-distance observer sensor 621, the long-distance observer sensor 621 transmits an electric signal to the control unit 412, with the electric signal indicating that there is not an observer. Receiving the electric signal, the control unit 412 determines that there is not an observer in the vicinity of the microscope 601, stops the voltage supply to the light source 410, and puts the light source 410 into the OFF state.

Time T5 is the time when the observer comes closer to the microscope 601 and enters the sensing area of the long-distance observer sensor 621 to resume the observation. At this point, the long-distance observer sensor 621 transmits an electric signal to the control unit 412, with the electric signal indicating that there is an observer, as in the control operation performed at time T3. The control unit 412 then puts the light source 410 into the standby state, as in the control operation performed at time T3.

Time T6 is the time when the observer comes even closer to the microscope 601 and enters the sensing area of the short-distance observer sensor 620 to resume the observation. At this point, the short-distance observer sensor 620 transmits an electric signal to the control unit 412, with the electric signal indicating that there is an observer. Receiving the electric signal, the control unit 412 controls the supply voltage for the light source 410 to be the rated lighting voltage V1, and puts the light source 410 into the ON state. With this arrangement, the light source 410 emits the optimum amount of light for observation.

As described above, the long-distance observer sensor 621 having a larger sensing area than the short-distance observer sensor 620 is used in addition to the short-distance observer sensor 620 that has a sensing area in which an observer is present when actually using the microscope 601. Accordingly, when an observer actually approaches the microscope 601 to resume observation, the light source 410 is already in the standby state, and can quickly return to the ON state. Meanwhile, it is sufficient for the short-distance observer sensor 620 to only sense an area very close to itself. Accordingly, the short-distance observer sensor 620 has a very low probability of sensing a subject as a result of excess sensing. In this manner, an unnecessary voltage supply in the case of excess sensing can be minimized.

Figure 17:
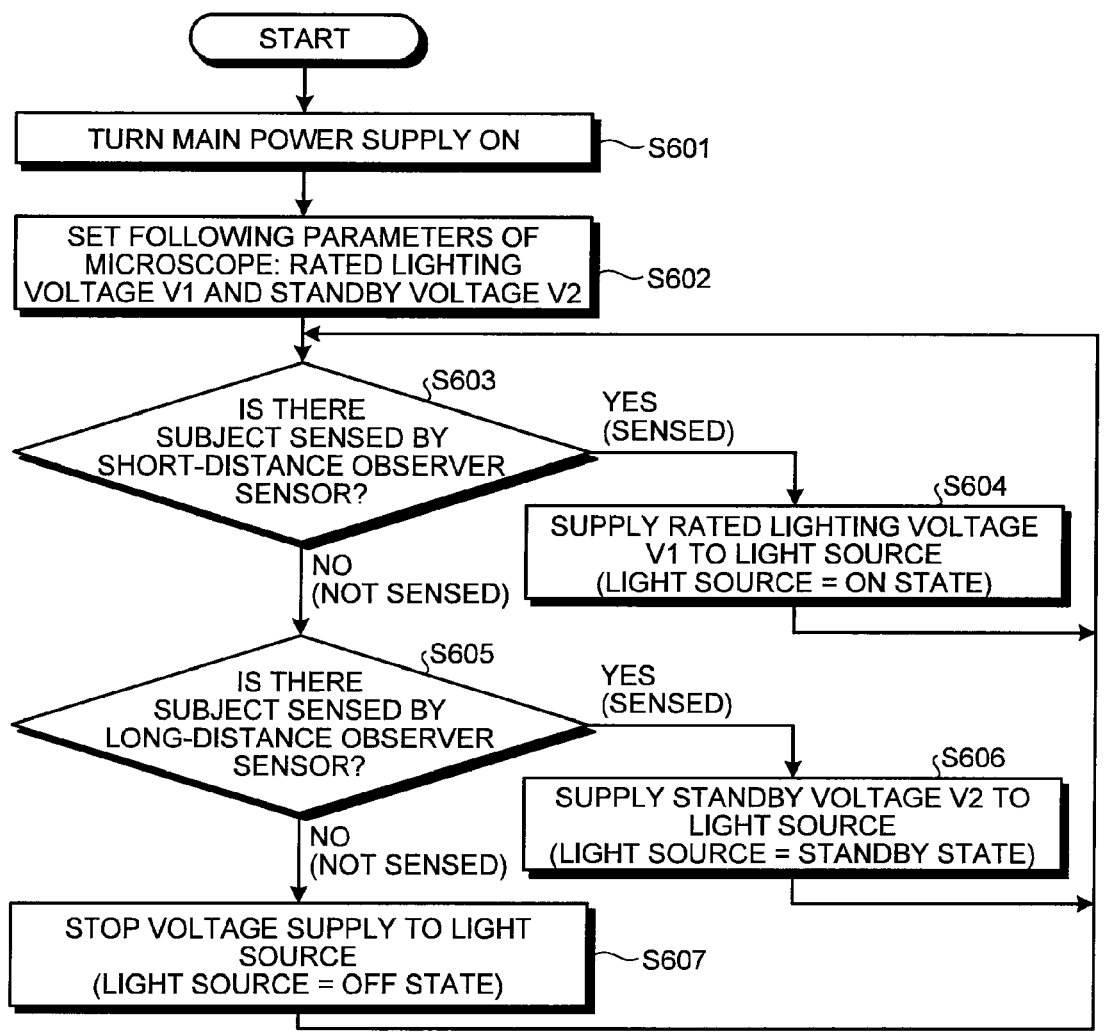
FIG. 17 is a flowchart showing the example of the control operation to be performed on the power supply to the light source in the microscope according to the sixth embodiment of the present invention.

FIG. 17 is a flowchart showing an example of a control operation to be performed on the power supply to the light source in the microscope 601 according to this embodiment. FIG. 17 shows the control flow for performing the control operation illustrated in FIG. 16. Referring to FIG. 17, the flow of the control operation to be performed on the power supply to the light source 410 is described below. Although voltage is again shown as a parameter related to the power supply, the present invention is not particularly limited to that.

The flowchart shown in FIG. 17 starts from step S601. Step S601 is the same as steps S401 and S501 in the flowcharts shown in FIGS. 11 and 14, and therefore, explanation of it is omitted herein.

At step S602, initial setting of the microscope 601 is performed. More specifically, the rated lighting voltage V1 in the ON state of the light source 410 and the standby voltage V2 in the standby state of the light source 410 are set. In this step, predetermined values may be automatically set as the values of the parameters, or the values of the parameters may be manually set by an observer.

At step S603, a check is made to determine whether a subject has been sensed by the short-distance observer sensor 620. If the determination result is "YES" (if there is a subject sensed by the short-distance observer sensor 620), the operation moves on to step S604. If the determination result is "NO" (if there is not a subject sensed by the short-distance observer sensor 620), the operation moves on to step S605.

At step S604, the rated lighting voltage V1 is supplied to the light source 410, since the short-distance observer sensor 620 has sensed a subject. As a result, the light source 410 is put into the ON state in which the light source 410 emits the optimum amount of light for observation. After that, the operation returns to step S603, and the above procedures are repeated.

The repeated procedures of steps S603 and S604 are equivalent to the control operation performed between time 0 and time T1 in FIG. 16. More specifically, in the operation flow shown in steps S603 and S604, a subject is sensed by the short-distance observer sensor 620, and the light source 410 is maintained in the ON state.

At step S605, a check is made to determine whether a subject has been sensed by the long-distance observer sensor 621. If the determination result is "YES" (if there is a subject sensed by the long-distance observer sensor 621), the operation moves on to step S606. If the determination result is "NO" (if there is not a subject sensed by the long-distance observer sensor 621), the operation moves on to step S607.

At step S606, the standby voltage V2 is supplied to the light source 410, since the long-distance observer sensor 621 has sensed a subject. As a result, the light source 410 is put into the standby state in which light emission is restrained. After that, the operation returns to step S603, and the above procedures are repeated.

The repeated procedures of steps S603, S605, and S606 are equivalent to the control operation performed between time T1 and time T2 in FIG. 16. More specifically, in the operation flow shown in those steps, a subject is sensed by the long-distance observer sensor 621, and the light source 410 is maintained in the standby state.

At step S607, the voltage supply to the light source 410 is stopped, since the long-distance observer sensor 621 has not sensed a subject. As a result, the light source 410 is put into the OFF state. After that, the operation returns to step S603, and the above procedures are repeated.

As described above, the microscope 601 of this embodiment includes the light source 410, and the short-distance observer sensor 620 and the long-distance observer sensor 621 having different sensing areas from each other. The light source 410 is put into the ON state, the OFF state, or the standby state. In the microscope 601 of this embodiment, the sensing area of the short-distance observer sensor 620 is situated very close to itself, and the sensing area of the long-distance observer sensor 621 is set larger than the sensing area of the short-distance observer sensor 620. With this arrangement, the light source 410 can be put into the ON state only when an observer comes very close to the microscope 601 to actually resume observation. Accordingly, an unnecessary voltage supply can be prevented. Also, power saving can be achieved, and specimens can be protected from excess illumination light emission. Further, the voltage to be supplied in the case of excess sensing can be restrained.

When a subject coming very close the microscope is sensed by the short-distance observer sensor 620, the subject has already been sensed by the long-distance observer sensor 621, and the light source 410 has been in the standby state. With this arrangement, the light source 410 can be quickly returned to the ON state when observation is resumed. Accordingly, the operability of the microscope 601 at the time of resumption of observation can be increased.

Seventh Embodiment

Figure 18:
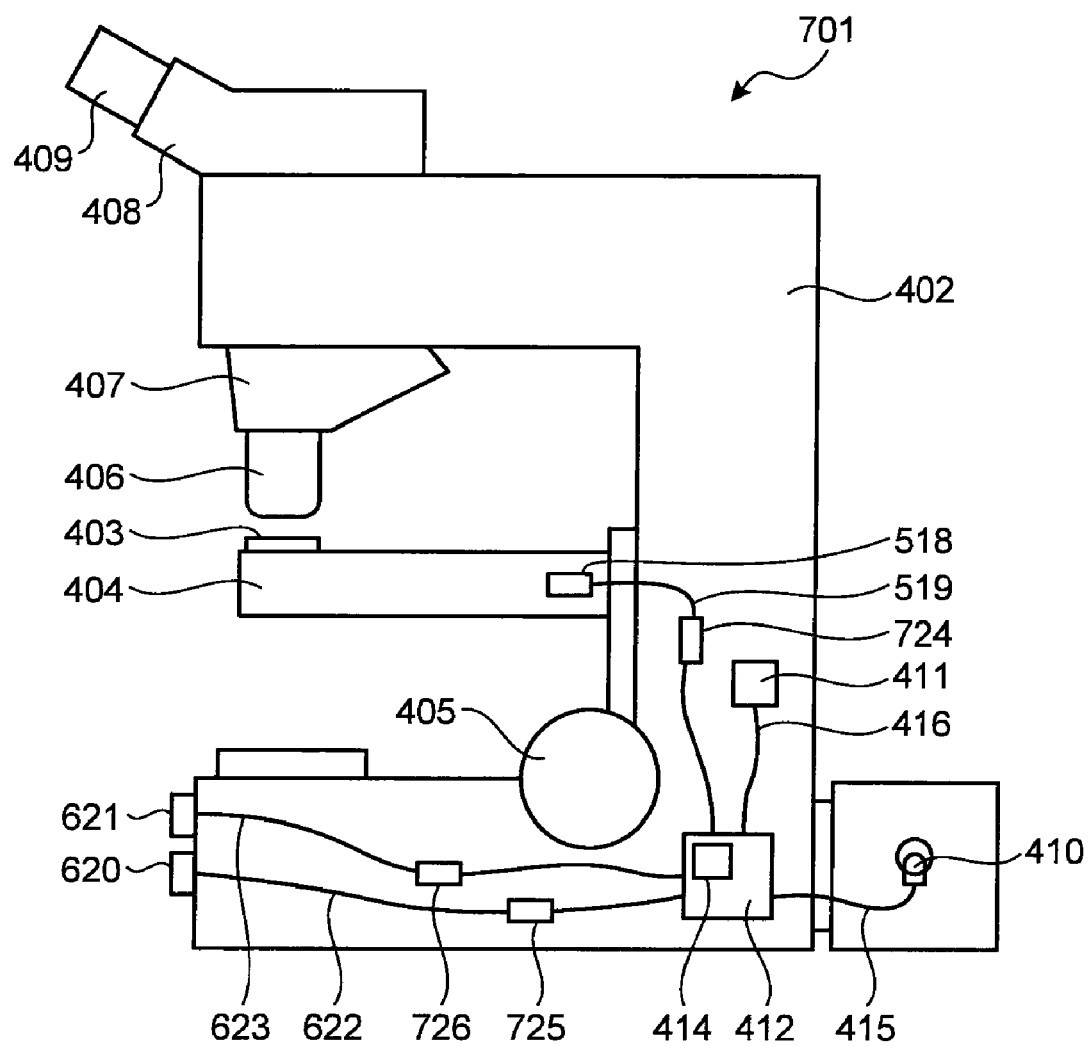
FIG. 18 shows an example structure of a microscope according to a seventh embodiment of the present invention.

Referring now to FIG. 18, the structure of a microscope according to this embodiment is described. FIG. 18 shows an example structure of the microscope according to this embodiment.

Many of the components of a microscope 701 shown in FIG. 18 are the same as those of the microscopes 401, 501, and 601 shown in FIGS. 8, 12, and 15, respectively. Therefore, the same components as those shown in FIGS. 8, 12, and 15 are denoted by the same reference numerals as those shown in FIGS. 8, 12, and 15, and explanation of them is omitted herein.

The microscope 701 illustrated in FIG. 18 includes the three sensors; the observing operation sensor 518, the short-distance observer sensor 620, and the long-distance observer sensor 621. A switch 724 is provided on the signal line 519 connecting the observing operation sensor 518 to the control unit 412. When the switch 724 is turned on, the observing operation sensor 518 starts a sensing operation. When the switch 724 is turned off, the observing operation sensor 518 stops the sensing operation.

Likewise, a switch 725 is provided on the signal line 622 connecting the short-distance observer sensor 620 to the control unit 412. When the switch 725 is turned on, the short-distance observer sensor 620 starts a sensing operation. When the switch 725 is turned off, the short-distance observer sensor 620 stops the sensing operation.

Likewise, a switch 726 is provided on the signal line 623 connecting the long-distance observer sensor 621 to the control unit 412. When the switch 726 is turned on, the long-distance observer sensor 621 starts a sensing operation. When the switch 726 is turned off, the long-distance observer sensor 621 stops the sensing operation.

By switching on and off the switches 724, 725, and 726, the microscope 701 of this embodiment can provide the same functions as those of the microscope 401 of the fourth embodiment, the microscope 501 of the fifth embodiment, and the microscope 601 of the sixth embodiment.

More specifically, by turning on only one of the switches 725 and 726 among the above three switches, the microscope 701 can provide the same functions as those of the microscope 401 of the fourth embodiment. In this case, the short-distance observer sensor 620 or the long-distance observer sensor 621 of the microscope 701 is equivalent to the observer sensor 413 of the microscope 401. When the switch is turned on, the control operation to be performed by the control unit 412 in this case is switched to the control operation to be performed in the microscope 401.

Further, by turning on the switch 724 and one of the switches 725 and 726 among the above three switches, the microscope 701 can provide the same functions as those of the microscope 501 of the fifth embodiment. In this case, the short-distance observer sensor 620 or the long-distance observer sensor 621 of the microscope 701 is equivalent to the observer sensor 413 of the microscope 501. When the switches are turned on, the control operation to be performed by the control unit 412 in this case is switched to the control operation to be performed in the microscope 501.

Further, by turning on both the switches 725 and 726 among the above three switches, the microscope 701 can provide the same functions as those of the microscope 601 of the sixth embodiment. When the switches are turned on, the control operation to be performed by the control unit 412 in this case is switched to the control operation to be performed in the microscope 601.

As described above, in the microscope 701 of this embodiment, the same functions as those of the microscope 401, the microscope 501, or the microscope 601 can be selectively used by only turning on one or more of the switches in accordance with the situation. In this manner, the same advantages as those of the microscope 401, the microscope 501, and the microscope 601 can be achieved.

Also, for example, there might be an environment where the light source 410 is automatically turned on and off with high frequency, because there are many users. In such a case, all of those switches are turned off, to restrain the automatic switching on and off of the light source 410. Accordingly, adverse influence on the life of the light source due to excess switching operations can be restrained. The functions of the switches 724, 725, and 726 may be realized by software installed in the control unit 412.

The present invention is not limited to the example structures of the above described embodiments, and various changes and modifications may be made to them without departing from the scope of the invention.

(Note 1)
A microscope comprising:
an illumination light source for illuminating a specimen;
a control unit that controls an amount of light of the illumination light source; and
a short-distance sensor that senses the presence of an observer in the vicinity of the microscope,
wherein,
when the short-distance sensor senses the absence of an observer, the control unit reduces the amount of light of the illumination light source, and keeps the illumination light source on,
when the short-distance sensor senses that an observer has returned, the control unit increases the amount of light of the illumination light source to the original amount,
the control unit further includes a time measuring unit,
when the time measuring unit measures a predetermined absence time during which there is not an observer, the control unit turns off the illumination light source,
when the short-distance sensor temporarily senses an observer, the control unit temporarily increases the amount of light of the illumination light source to the original amount, and
when the short-distance sensor senses that an observer has returned, the control unit increases the amount of light of the illumination light source to the original amount.

(Note 2)
The microscope of Note 1, further comprising:
an observation operating unit that operates in synchronization with observing operations; and
an observing operation sensor that senses an operation of the observation operating unit,
wherein,
when the short-distance sensor senses an observer while the illumination light source is off, the control unit turns on the illumination light source, with the amount of light being in a reduced state; and
when the observing operation sensor senses an operation of the observation operating unit while the amount of light of the illumination light source is in the reduced state, the control unit increases the amount of light of the illumination light source to the original amount.

(Note 3)
The microscope of Note 1, further comprising
a second sensor that can perform sensing operations in a larger area than the short-distance sensor,
wherein,
when the second sensor senses an observer while the illumination light source is off, the control unit turns on the illumination light source, with the amount of light being in a reduced state, and
when the short-distance sensor senses an observer while the amount of light of the illumination light source is in the reduced state, the control unit increases the amount of light of the illumination light source to the original amount.

(Note 4)
The microscope of Note 1, wherein the predetermined absence time is adjustable.

The above and other features, advantages and technical and industrial significance of this invention will be better understood by reading the following detailed description of presently preferred embodiments of the invention, when considered in connection with the accompanying drawings.

What is claimed is:
1. A microscope comprising:
a microscope main unit that includes a stage on which a specimen is placeable;
a light source that is provided on the microscope main unit and emits illumination light for illuminating the specimen;
a main power supply that is operable to be turned on and off;
a non-contact sensor that senses the presence or absence of a subject in a predetermined space in a front area or a side area of the microscope main unit, without requiring that the subject contact the sensor;
a determining unit that determines based on a result of the sensing by the sensor whether the subject moves; and
a control unit that turns on the light source when the main power supply is turned on, maintains the light source in an ON state when the determining unit determines that the subject moves, and turns off the light source when the determining unit determines that the subject does not move for a predetermined period of time.

2. The microscope according to claim 1, wherein the sensor is attached to a base unit comprising a base of the microscope main unit, and performs a sensing operation in an area extending obliquely upward from a front of the microscope main unit.

3. The microscope according to claim 1, wherein the sensor is attached to a side of a base unit comprising a base of the microscope main unit, and performs a sensing operation in an area extending from the side of the microscope main unit.

4. The microscope according to claim 1, wherein, when the main power supply is turned on, the control unit starts measuring time until the predetermined period of time passes, and when the determining unit determines that the subject moves, the control unit again starts measuring time from zero.

5. The microscope according to claim 1, wherein, after putting the light source into an OFF state, the control unit maintains the light source in the OFF state.

6. The microscope according to claim 1, wherein the sensor senses a heat source having a temperature difference as the subject.

7. The microscope according to claim 1, wherein the sensor includes a motion sensor that receives infrared rays radiated from a heat source having a temperature difference, and an attenuation member that is provided in front of the motion sensor in an incident direction of the infrared rays and attenuates the incident infrared rays.

8. The microscope according to claim 7, wherein one of a first lens and a second lens is mountable on the motion sensor so that the lens is replaceable, the second lens having a shorter focal distance than the first lens and a wider visual field than the first lens.

* * * * *